United States Patent
Kersey et al.

(10) Patent No.: US 6,594,410 B2
(45) Date of Patent: Jul. 15, 2003

(54) WIDE RANGE TUNABLE OPTICAL FILTER

(75) Inventors: Alan D. Kersey, Glastonbury, CT (US); Michael A. Davis, Glastonbury, CT (US); Martin A. Putnam, Cheshire, CT (US); Timothy J. Bailey, Longmeadow, MA (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/751,589

(22) Filed: Dec. 29, 2000

(65) Prior Publication Data

US 2002/0025110 A1 Feb. 28, 2002

Related U.S. Application Data

(63) Continuation-in-part of application No. 09/648,524, filed on Aug. 26, 2000.

(51) Int. Cl.[7] .................................................. G02B 6/26

(52) U.S. Cl. ........................................... 385/15; 385/24

(58) Field of Search .............................. 385/16, 17, 24, 385/27, 31, 37, 46, 47; 359/124, 127, 130

(56) References Cited

U.S. PATENT DOCUMENTS

| | | | |
|---|---|---|---|
| 4,725,110 A | 2/1988 | Glenn et al. .................. 385/37 |
| 4,807,950 A | 2/1989 | Glenn et al. .................. 385/37 |
| 4,915,467 A | 4/1990 | Berkey ......................... 385/43 |
| 5,007,705 A | * 4/1991 | Morey et al. .................. 385/12 |
| 5,042,898 A | 8/1991 | Morey et al. .................. 385/37 |
| 5,125,946 A | 6/1992 | Bhagavatula ................ 385/147 |
| 5,235,659 A | 8/1993 | Atkins et al. ................ 385/124 |
| 5,283,686 A | 2/1994 | Huber ......................... 359/130 |
| 5,388,173 A | 2/1995 | Glenn .......................... 385/37 |
| 5,457,758 A | 10/1995 | Snitzer ........................ 385/30 |
| 5,459,801 A | 10/1995 | Snitzer ........................ 385/30 |
| 5,469,520 A | 11/1995 | Morey et al. .................. 385/37 |
| 5,574,807 A | 11/1996 | Snitzer ........................ 385/24 |
| 5,579,143 A | 11/1996 | Huber ......................... 359/130 |
| 5,608,571 A | 3/1997 | Epworth et al. ............. 359/341 |
| 5,608,825 A | 3/1997 | Ip ............................... 385/24 |
| 5,691,999 A | 11/1997 | Ball et al. ..................... 372/20 |
| 5,706,375 A | 1/1998 | Mihailov et al. ............. 385/24 |

(List continued on next page.)

FOREIGN PATENT DOCUMENTS

| | | |
|---|---|---|
| EP | 0857988 | 8/1998 |
| EP | 1063545 | 12/2000 |
| EP | 1065813 | 1/2001 |
| EP | 1065821 | 1/2001 |
| WO | WO8204328 | 12/1982 |
| WO | WO9530926 | 11/1995 |
| WO | WO0037969 | 6/2000 |
| WO | WO0037976 | 6/2000 |
| WO | WO0039617 | 7/2000 |

OTHER PUBLICATIONS

J.A.J. Fells et al. Twin Fibre Grating Adjustable Dispersion Compensator for 40 GBIT/S, ECOC Conference 2000, Oct. 2000.

*Primary Examiner*—Georgia Epps
*Assistant Examiner*—M. Abutayeh

(57) ABSTRACT

A tunable optical filter filters is provided that has a pair of tunable Bragg grating units optically coupled to respective ports of a 4-port circulator for filtering a selected wavelength band or channel of light from a DWDM input light. Each grating unit includes an array of Bragg gratings written or embedded within a respective tunable optical element to provide a tunable optical filter that functions over a wide spectral range greater than the tunable range of each grating element. The reflection wavelengths of the array of gratings of each respective grating element is spaced at a predetermined spacing, such that when a pair of complementary gratings of the grating elements are aligned, the other complementary gratings are misaligned. Both of the optical elements may be tuned to selectively align each complementary grating over each corresponding spectral range.

56 Claims, 19 Drawing Sheets

U.S. PATENT DOCUMENTS

| | | |
|---|---|---|
| 5,712,717 A | 1/1998 | Hamel et al. ............... 359/130 |
| 5,717,798 A | 2/1998 | Strasser et al. ............... 385/37 |
| 5,726,785 A | 3/1998 | Chawki et al. ............. 359/130 |
| 5,745,626 A | 4/1998 | Duck et al. .................. 385/96 |
| 5,748,350 A | 5/1998 | Pan et al. ................... 359/130 |
| 5,771,112 A | 6/1998 | Hamel et al. ............... 359/128 |
| 5,815,299 A | 9/1998 | Bayart et al. ............... 359/171 |
| 5,825,520 A | 10/1998 | Huber ......................... 359/130 |
| 5,841,918 A | 11/1998 | Li ................................. 385/24 |
| 5,909,295 A | 6/1999 | Li et al. ..................... 359/130 |
| 5,995,255 A | 11/1999 | Giles .......................... 359/124 |
| 6,040,932 A | 3/2000 | Duck et al. .................. 359/124 |
| 6,061,484 A | 5/2000 | Jones et al. .................... 385/24 |
| 6,091,744 A | 7/2000 | Sorin et al. .................... 372/20 |
| 6,091,870 A | 7/2000 | Eldada ......................... 385/37 |
| 6,094,284 A | 7/2000 | Huber ......................... 359/130 |
| 6,097,487 A * | 8/2000 | Kringlebotn et al. ........ 356/450 |
| 6,160,931 A | 12/2000 | Asakura ....................... 385/24 |
| 6,229,827 B1 * | 5/2001 | Fernald et al. ................. 372/20 |
| 6,236,782 B1 * | 5/2001 | Kewitsch et al. ............. 385/37 |
| 6,310,990 B1 * | 10/2001 | Putnam et al. ................ 385/12 |

\* cited by examiner

WIDE RANGE TUNABLE OPTICAL FILTER

CROSS REFERENCE TO RELATED APPLICATIONS

This is a continuation-in-part of U.S. patent application Ser. No. 09/648,524 filed Aug. 26, 2000.

Co-pending U.S. patent application Ser. No. 09/648,525 (CiDRA Docket No. CC-0273), entitled "Optical Filter Having A Shaped Filter Function", filed Aug. 26, 2000; and co-pending U.S. patent application Ser. No. 09/752,332 (CiDRA Docket No. CC-0322), contain subject matter related to that disclosed herein, and which are incorporated herein by reference in their entirety.

TECHNICAL FIELD

The present invention relates to a tunable optical device, and more particularly to an optical filter including at least two arrays of reflective elements, such as Bragg gratings, wherein the tunable spectral range of the optical filter is greater than the tunable spectral range of the reflective elements.

BACKGROUND ART

The telecommunication industry is turning towards optical networks to provide higher capacity (bandwidth) of data transfer for new applications. Consequently, the industry is continually developing technology to increase the bandwidth of the optical networks, which includes the technology of wavelength division multiplexing (WDM). A number of optical signals can be carried simultaneously on the optical fiber by modulating each signal on a different wavelength of light. The light propagating through a single optical fiber therefore includes a plurality of wavelength bands, referred to as channels, wherein each channel or wavelength band is centered at a reflection wavelength. The wavelength bands are sufficiently separated so that they do not overlap. Typically, networks that carry about eight channels or more are referred to as dense wavelength division multiplexing (DWDM) systems, such systems can carry greater than 200 channels.

The technology of optical networks is heading toward a more dynamic, flexible, and intelligent networking architecture to improve service delivery time. A key element of the emerging optical network is a tunable optical filter for selectively filtering a channel from the DWDM light propagating through the optical network. The tunable channel filter enables a channel to be dynamically switched, routed, monitored and conditioned.

It is known in the art of optical networks that Bragg gratings written in an optical fiber may be used to act as a tunable filter, as is described in U.S. Pat. No. 5,815,299, entitled "Method and System for Equalizing Respective Power Levels of Channels of a Received Optical Frequency Division Multiplexed Signal" to Bayart et al.; U.S. Pat. No. 5,995,255, entitled "Concatenated Fiber Grating Optical Monitor" to Giles, and U.S. Pat. No. 5,579,143, entitled "Optical System With Tunable In-Fiber Gratings" to Huber.

The tunable filter described in the aforementioned U.S. Pat. Nos. 5,815,299 and 5,995,155 use a single fiber Bragg grating to filter a selected optical channel or a limited number of channels from broadband light tapped off an optical network. Consequently, the optical system requires a number of tunable filters to monitor or condition each optical channel. In some instances, the number of tunable filters can equal the number of optical channels.

It is also known in the art to add a light signal to a fiber optic transmission line using a device comprising a pair of substantially identical Bragg-Evanescent-Couplers (BEC) devices that are cascaded in series, whereby both BECs reflect light having wavelengths in the region of $\lambda_n$, as described in U.S. Pat. No. 5,459,801 to Snitzer, entitled "Coupler Used To Fabricate Add-Drop Devices, Dispersion Compensators, Amplifiers, Oscillators, Superluminescent Devices, and Communications Systems".

It is further known, as described in U.S. Pat. No. 5,841,918 to Li, entitled "Wavelength and Bandwidth Tunable Optical System" of a system for modifying an input optical signal by reducing its bandwidth and/or modifying its central wavelength. The system includes at least two optical filters optically coupled to a circulator. The first filter produces a predetermined reflected band of the input optical signal. The second filter produces a predetermined transmission band as part of the reflected band. One or both of the filters are tunable to modify the wavelength and/or bandwidth of the optical filter.

SUMMARY OF THE INVENTION

An object of the present invention is to provide a tunable optical filter having a pair of grating elements, which are tunable over a narrow range, that enable the effective optical filtering characteristics of the optical filter to be tuned over a spectral band of the broadband light, wider than that of the grating elements.

In accordance with an embodiment of the present invention, a tunable optical filter device includes a first optical filter having a plurality of first reflective elements. Each of the first reflective elements has a respective first reflective filter function centered at respective reflection wavelengths for reflecting a respective first wavelength band of light. Each of the first reflective filter functions is spaced and substantially non-overlapping. A second optical filter is optically connected to the first optical filter to receive the first wavelength bands of light. The second optical filter includes a plurality of second reflective elements. Each of the second reflective elements has a respective second reflective filter function centered at respective reflection wavelengths for reflecting a respective second wavelength band of light. Each of the second reflective filter functions is spaced and substantially non-overlapping. One of the first and second optical filters is tunable to overlap at least one of the first reflective filter functions and one of the second reflective filter functions.

In accordance with another embodiment of the present invention, a method for selectively filtering an optical wavelength band from an input light includes providing a first optical filter including a plurality of first reflective elements. Each of the first reflective elements has a respective first reflective filter function centered at respective reflection wavelengths for reflecting a respective first wavelength band of light. Each of the first reflective filter functions being spaced and substantially non-overlapping. The method further includes directing the input light to the first optical filter, and providing a second optical filter including a plurality of second reflective elements. Each of the second reflective elements has a respective second reflective filter function centered at respective reflection wavelengths for reflecting a respective second wavelength band of light. Each of the second reflective filter functions is spaced and substantially non-overlapping. The method also includes directing the plurality of the reflected first wavelength bands to the second optical filter, and tuning one of the first and second optical filters to overlap at least one of the first reflective filter functions and one of the second reflective filter functions.

In accordance with another embodiment of the present invention, a tunable optical filter device includes a first optical filter having a plurality of reflective elements. Each of the reflective elements has a respective reflective filter function centered at respective reflection wavelengths for reflecting a respective first wavelength band of light. Each of the first reflective filter functions is spaced and substantially non-overlapping. A second optical filter is optically connected to the first optical filter to receive the first wavelength bands of light. The second optical filter includes a plurality of transmissive elements. Each of the transmissive elements has a respective transmissive filter function centered at respective transmissive for transmitting a respective second wavelength band of light. Each of the transmissive filter functions is spaced and substantially non-overlapping. One of the first and second optical filters is tunable to overlap at least one of the reflective filter functions and one of the transmissive filter functions.

In accordance with another embodiment of the present invention, a tunable optical filter device includes a first optical filter having a plurality of transmissive elements. Each of the transmissive elements has a respective transmissive filter function centered at respective transmissive wavelengths for transmitting a respective first wavelength band of light. Each of the transmissive filter functions is spaced and substantially non-overlapping. A second optical filter is optically connected to the first optical filter to receive the first wavelength bands of light. The second optical filter includes a plurality of transmissive elements. Each of the reflective elements has a respective reflective filter function centered at respective reflection wavelengths for reflecting a respective wavelength band of light. Each of the reflective filter functions is spaced and substantially non-overlapping. One of the first and second optical filters is tunable to overlap at least one of the transmissive filter functions and one of the reflective filter functions.

In accordance with another embodiment of the present invention, a tunable optical filter device includes a first optical filter having a plurality of first reflective elements. Each of the first reflective elements has a respective first reflective filter function centered at respective reflection wavelengths for reflecting a respective first wavelength band of light. Each of the first reflective filter functions is spaced and substantially non-overlapping. A second optical filter is optically connected to the first optical filter to receive the first wavelength bands of light. The second optical filter includes a second reflective element. The second reflective element has a respective second reflective filter function centered at respective reflection wavelength for reflecting a respective second wavelength band of light. One of the first and second optical filters is tunable to overlap only one of the first reflective filter functions and the second reflective filter function.

In accordance with another embodiment of the present invention, a tunable optical filter device includes a first optical waveguide having a plurality of first gratings. Each of the first gratings has a respective first reflective filter function centered at respective reflection wavelengths for reflecting a respective first wavelength band of light. Each of the first reflective filter functions is spaced and substantially non-overlapping. A second optical waveguide is optically connected to the first optical waveguide to receive the first wavelength bands of light. The second optical waveguide includes a plurality of second gratings. Each of the second gratings has a respective second reflective filter function centered at respective reflection wavelengths for reflecting a respective second wavelength band of light. Each of the second reflective filter functions is spaced and substantially non-overlapping. One of the first and second optical waveguides is tunable to overlap only one of the first reflective filter functions and one of the second reflective filter functions.

BEST MODE FOR CARRYING OUT THE INVENTION

Figure 1:
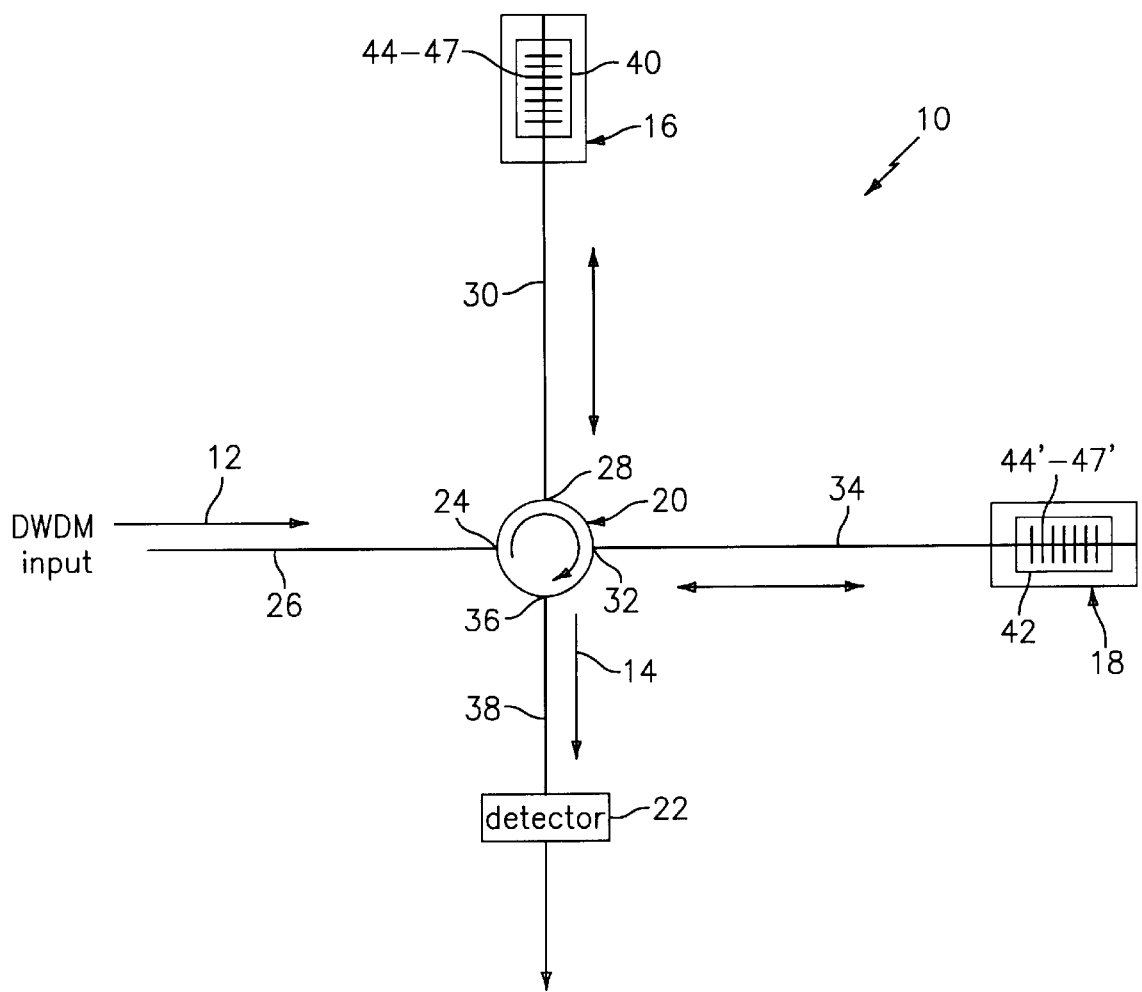
FIG. 1 is a block diagram of a tunable optical filter having a pair of grating elements in accordance with the present invention.

Referring to FIG. 1, a tunable optical filter, generally shown as 10, filters a selected wavelength band 14 of the input light from a DWDM input light 12. The input light comprises a plurality of wavelength bands or optical channels of light, each of which are centered at a respective channel wavelength. The optical filter 10 of the present invention is similar to the tunable optical filters described in co-pending U.S. patent application Ser. No. 09/648,525 (CiDRA Docket No. CC-0273), entitled "Optical Filter Having A Shaped Filter Function", which is incorporated herein by reference in its entirety.

In one embodiment of the present invention, the tunable optical filter 10 includes a pair of tunable Bragg grating units 16, 18, optically coupled to respective ports of an optical directing device 20, such as a 4-port circulator. Each grating unit 16, 18 tunes a respective grating element 40, 42 (i.e., optical waveguides), having a cladding and an inner core disposed therein. Each grating element 40, 42 includes an array or set of reflective elements 44–47, 44'–47', such as Bragg gratings written or impressed into the core, to provide a tunable optical filter 10 that functions over an extended spectral range. The present invention uses a pair of grating elements 40, 42 that are tunable over a limited or narrow range to provide an optical filter tunable over a wide spectral range greater than the individual tunable ranges of the grating elements. Inherently, the tunable range of a grating is inversely proportional to the length of the grating; as such a shorter grating is tunable over a greater spectral range than that of a longer grating. However, the filtering of the broadband light 12 using a single long grating has a distinct disadvantage in tuning the grating by compression techniques, namely, the longer grating is more susceptible to buckling when compression-tuned.

Figure 2:
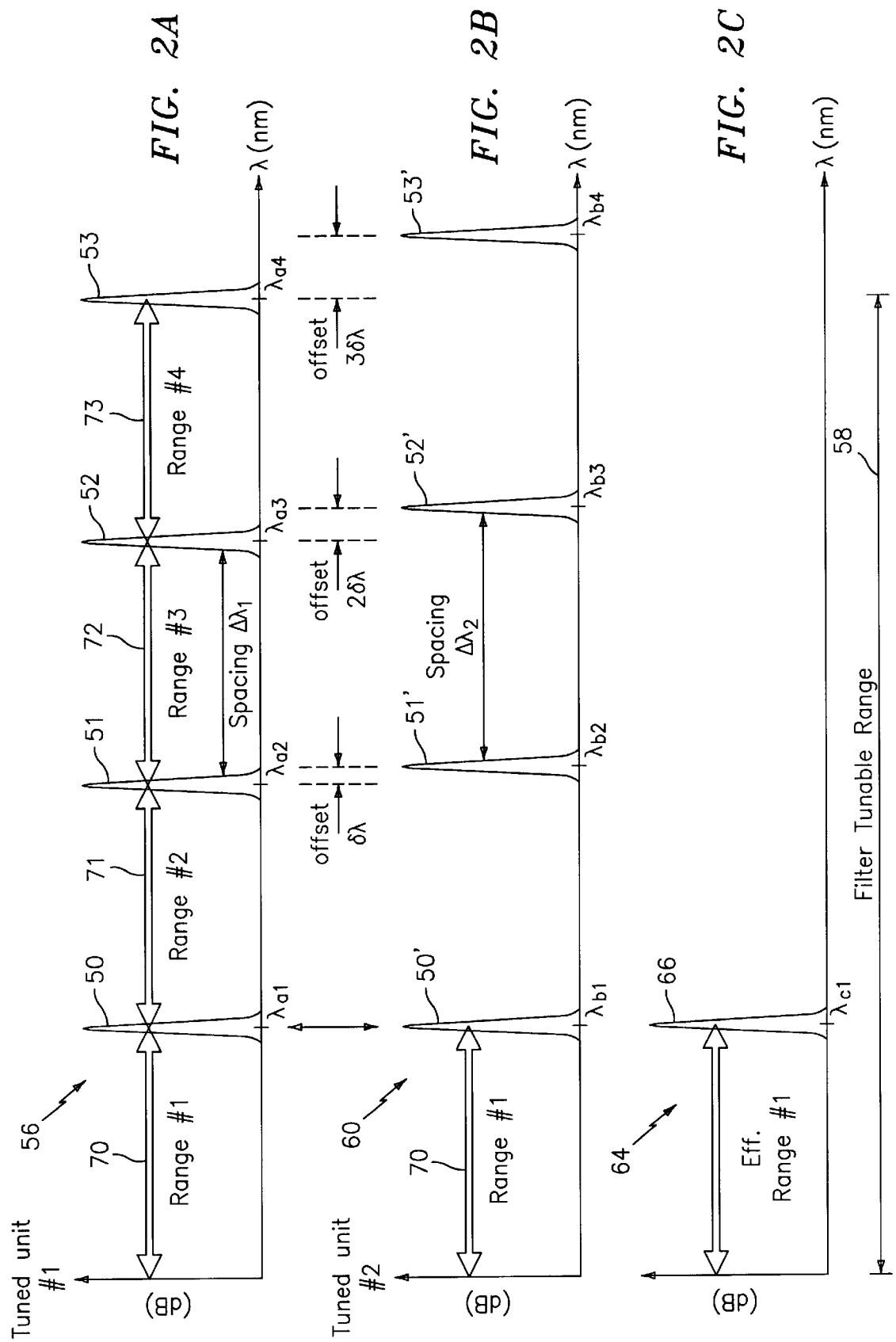
FIGS. 2A–2C are graphical representations of the effective filter function of the tunable optical filter of FIG. 1, and the filter functions of the grating elements of the tunable optical filter of FIG. 1.

The multi-component grating element 40 reflects a plurality of wavelength bands of light, which are centered at the reflection wavelengths $\lambda_{a1}-\lambda_{a4}$ of each respective grating 44–47, while passing the other wavelength bands of light through the gratings, as shown in FIG. 2A. Similarly, The multi-component grating element 42 reflect a plurality of wavelength bands of light, which are centered at the reflection wavelengths $\lambda_{b1}-\lambda_{b4}$ of each respective grating 44'–47', while passing the other wavelength bands of light through the gratings, as shown in FIG. 2B. The gratings 44, 47, 44'–47' of each respective grating element 40, 42 have different reflection wavelengths, separated by a predetermining spacing $\Delta\lambda_1, \Delta\lambda_2$. The gratings of each grating element may be written over each other in a co-located manner, or may be written concatenated along the core of each grating elements.

In the operation of the optical filter 10, a first port 24 of the circulator 20 receives the input light 12 that is transmitted through optical fiber 26. The light 12 may originate from a light source or tapped off an optical network (not shown). The circulator 20 directs the input light 12 in a clockwise direction to a second port 28 of the circulator. The input light 12 exits the second port 28 and propagates through optical fiber 30 to grating element 40 of the grating unit 16. The grating element 40 is tuned to reflect a plurality of selected wavelength bands of the input light centered at reflection wavelengths $\lambda_{a1}-\lambda_{a4}$, as shown in FIG. 2A, back to the second port 28 of the circulator 20, and passes the remaining wavelength bands of the input light through the grating element 40, as will be described in greater detail hereinafter.

The circulator 20 then directs the reflected wavelength bands to a third port 32 of the circulator 20. The reflected wavelength bands exit the third port 32 and propagate through optical fiber 34 to grating element 42 of grating unit 18, which has a filter function as shown in FIG. 2B. The grating element 42 is simultaneously tuned to reflect a substantial portion of one of the reflected wavelength bands back to the third port 32 of the circulator 20, as shown in FIG. 2C. The circulator directs the double reflected wavelength band to a fourth port 36 of the circulator 20 to the output of the optical filter 10 through optical fiber 38. An optical wavelength detector 22 may be connected to an output port of the circulator 20 for detecting and analyzing specific parameters (i.e., signal-to-noise ratio, power frequency, power density, etc.) of the selected wavelength band of light 14. One will appreciate that the detector 22 is not necessary to practice the present invention.

While the grating units 16, 18 of the tunable optical filter 10 are interconnected to a 4-port circulator, one will appreciate that it is within the scope of the present invention that any other optical directing device or means may be substituted for the circulator 20, such as an optical coupler, optical splitter or free space.

Referring to FIGS. 2A–2C, the reflective characteristics of the array of gratings 44–47, 44'–47' are defined by their respective filter functions 50–53, 50'–53'. In one embodiment, the reflection wavelengths $\lambda_{a1}-\lambda_{a4}$ of the filter functions 50–53 of gratings 44–47 and the reflection wavelengths $\lambda_{b1}-\lambda_{b4}$ of the filter function 50'–53' of gratings 44'–47' are tuned simultaneously to align a selected pair of complementary reflection wavelengths (i.e. $\lambda_{a1}, \lambda_{b1}$) to reflect a portion of the aligned wavelength bands.

FIG. 2A provides a graphical representation 56 of the reflective characteristics of the first tunable grating element 40. FIG. 2B provides a graphical representation 60 of the grating characteristics of the second tunable grating element 42. FIG. 2C provides a graphical representation 64 of the grating characteristics of the resulting effective filtering function 66 of the optical filter 10. Each of the graphs is aligned vertically to align the y-axis, which represents the attenuation in decibels (dB) of the filtering function of the grating elements 40, 42 and the optical filter 10. The x-axis represents the wavelength (λ) in nanometers (nm).

Referring to FIG. 2A, the reflective characteristics of the first tunable grating element 40 is defined by four respective optical filtering functions 50–53 centered nominally at reflection wavelengths $\lambda_{a1}$–$\lambda_{a4}$ respectively, which correspond to the gratings 44–47 of the first grating element 40. The reflection wavelengths $\lambda_{a1}$–$\lambda_{a4}$ of the gratings 44–47 are spaced equally (at spacing $\Delta\lambda_1$) over the tunable spectral range 58 of the optical filter 10. The spacing between each of the reflection wavelengths of the gratings represents the minimum tunable range of each grating. One will appreciate that the spacing $\Delta\lambda_1$ between the reflection wavelengths of the gratings 44–47 provides a wide spectral span to park the wavelength bands that are not aligned with the complementary wavelength band. For example, the spacing ($\Delta\lambda_1$) between the filter functions 50–53 of gratings 44–47 provide a wide spectral gap to park the filter functions 51'–53' of gratings 44'–47' when filter function 50, 50' are aligned.

Referring to FIG. 2B, the reflective characteristics of the second tunable grating element 42 is defined by four optical filtering functions 50'–53' centered at reflection wavelengths $\lambda_{b1}$–$\lambda_{b4}$ respectively, which correspond to the gratings 44'–47' of the second grating element. The spacing ($\Delta\lambda_2$) between the reflection wavelengths $\lambda_{b1}$–$\lambda_{b4}$ of the second grating element 42 is greater than the spacing ($\Delta\lambda_1$) between the reflection wavelengths $\lambda_{a1}$–$\lambda_{a4}$ of the first gratings 44–47 by an offset of δλ. In other words, spacing $\Delta\lambda_2 = \Delta\lambda_1 + \delta\lambda$. The spacing offset (δλ) assures that when the first and second grating elements 40, 42 are tuned to align a selected reflection wavelength (i.e., $\lambda_{a1}, \lambda_{b1}$) of a pair of complementary gratings (i.e., 44, 44'), the remaining reflection wavelengths (i.e., $\lambda_{a2}$–$\lambda_{a4}, \lambda_{b2}$–$\lambda_{b4}$) of the other complementary gratings (i.e., 45–47, 45'–47') are offset.

For example, referring to FIGS. 2A–2C, both the first grating 44 of the complementary grating element 40 and the first grating 44' of the second grating element 42 are tuned simultaneously to align the respective reflection wavelengths at $\lambda_{a1}, \lambda_{b1}$. When aligned, the remaining filter functions 51'–53' of the gratings 45'–47' are offset from the reflection wavelengths 51–53 of the complementary gratings 45–47 respectively. Specifically, when the first gratings 44, 44'of the first and second grating elements 40, 42 are aligned, the reflection wavelengths $\lambda_{a2}, \lambda_{b2}$ of the complementary gratings 45, 45' are spaced by the offset (δλ), the reflection wavelengths $\lambda_{a3}, \lambda_{b3}$ of the complementary gratings 46, 46' are spaced by two times the offset (2δλ), and the reflection wavelengths $\lambda_{a4}, \lambda_{b4}$ of the complementary gratings 47, 47' are spaced by three times the offset (3δλ). The offset δλ is such that a sufficient spacing between the reflection wavelengths exists to prevent cross-talk or interference between adjacent gratings.

FIG. 2C is representative of the reflective characteristics of the tunable optical filter 10 that is defined by the effective filter function 66 centered at a reflection wavelength $\lambda_c$, which corresponds to the reflection wavelengths $\lambda_{a1}, \lambda_{b1}$ of the aligned filter functions 50, 50'. As described hereinabove, the effective filter function 66 of the optical filter 10 is the product of the aligned filter functions 50, 50'.

Each of the pairs of complementary gratings 44–47, 44'–47' is tunable over a range of wavelengths. As shown in FIGS. 2A–2C, the full tunable range of the optical filter 10 is broken down into four tunable ranges 70–73 corresponding to the four pairs of complementary gratings. For example, the complementary gratings 44, 44' of the first and second grating elements 40, 42 respectively, may be tuned simultaneously to filter the wavelength bands within a first range 70. The complementary gratings 45, 45' may be tuned simultaneously to filter the wavelength bands within a second range 71. The complementary gratings 46, 46' may be tuned simultaneously to filter the wavelength bands within a third range 72. The complementary gratings 47, 47' may be tuned simultaneously to filter the wavelength bands within a fourth range 73.

FIG. 2C shows that the resulting effective filter function 66 has an effective tunable range 58 equal to the four ranges 70–73 of each complementary pair of gratings, as will be described in greater detail hereinafter.

One should recognize that while the spacing of the reflection wavelengths of the gratings 44–47, 44'–47' of the first and second grating elements 40, 42 are shown to be equally spaced, the spacing of the reflection wavelengths $\lambda_{a1}$–$\lambda_{a4}, \lambda_{b1}$–$\lambda_{b4}$ may be varied, provided only one pair of complementary filter functions (i.e., 50, 50') are aligned when any given pair of complementary filter functions are aligned.

Similar to FIGS. 2A–2C, FIG. 3A provides a graphical representation 56 of the reflective characteristics of the first tunable grating element 40. FIG. 3B provides a graphical representation 60 of the grating characteristics of the second tunable grating element 42. FIG. 3C provides a graphical representation 64 of the grating characteristics of the resulting effective filtering function 66 of the optical filter 10.

Figure 3:
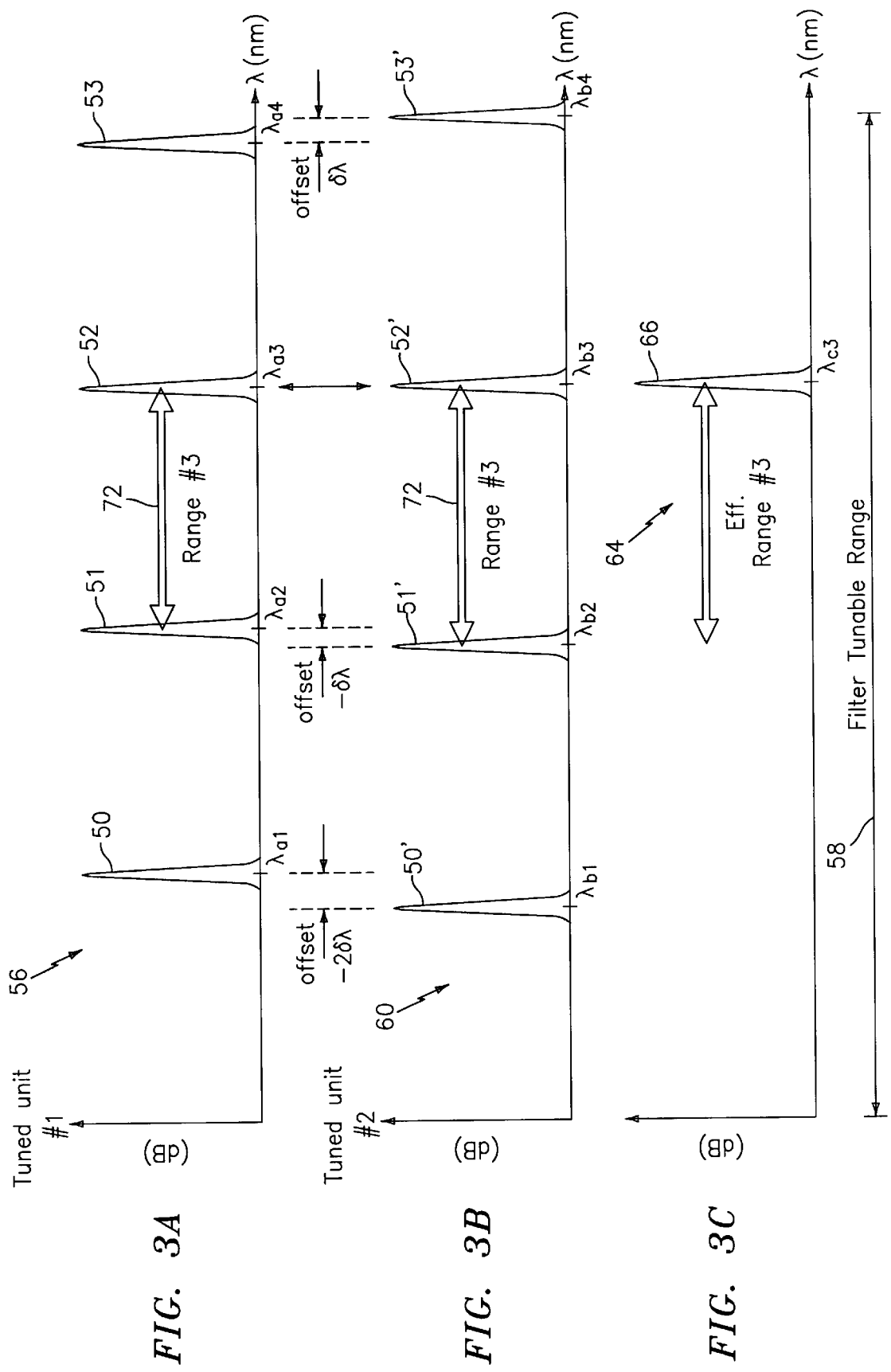
FIGS. 3A–3C are graphical representations of the effective filter function of the tunable optical filter of FIG. 1, and the filter functions of the grating elements of the tunable optical filter of FIG. 1.

FIG. 3B shows the filter functions 50'–53' shifted to the right by twice the offset (2δλ) so that the reflection wavelengths $\lambda_{a3}, \lambda_{b3}$ of the complementary gratings 46, 46' are aligned as a result of a predetermined additional compression provided to the second grating element 42. It is important to note that when the complementary filter functions 52, 52' are aligned, the other complementary filter functions are offset. Specifically, filter functions 50, 50' of the pair of complementary gratings 44, 44' are offset by −2δλ; filter functions 51, 51' of the pair of complementary gratings 45, 45' are offset by −δλ; and filter functions 53, 53' of the pair of complementary gratings 47, 47' are offset by δλ.

FIG. 3C shows the resulting effective filter function 66 is provided at wavelength $\lambda_{c3}$ having an effective tunable range equal to that of the range 72 of the complementary third gratings 46, 46'.

In one embodiment, the grating elements 40, 42 may be pre-strained to tune a pair of complementary gratings 44–47, 44'–47' to the same reflection wavelength; such that a predetermined wavelength band is filtered by the optical filter 10 in the normal or static state (i.e., no input command 100 is present). For example as shown in FIGS. 2A–2C, the grating elements 40, 42 are nominally set such that the first complementary gratings 44, 44' (the lowest wavelength gratings) are normally aligned. One will appreciate that the grating elements may be aligned in the normal state at any desired reflection wavelength. One will also appreciate that the grating elements may be set such that no reflection wavelengths are aligned in the normal state.

The tunable optical filter 10 may be tuned in a selection mode or a scanning mode of operation. In the selection mode, any wavelength band may be selected at any given time. To select a desired wavelength band, a wavelength input signal 100 representative of the selected wavelength band (see FIG. 8) is provided to a displacement controller 98, which provides a control signal at 99 to compression-tune the grating elements 40, 42, as will be described in greater detail hereinafter. In accordance with a tuning algorithm, the controller 98 determines which range 70–73 includes the selected wavelength band. The first grating element 40 is compressed to tune the grating 44–47 of the selected range to the selected wavelength band. Simultaneously, the second grating element 42 is compressed to tune the grating 44'–47' of the selected range to the selected wavelength band. As described hereinbefore, the second grating element 42 is additionally compressed to compensate for the nominal offset ($\delta\lambda$) of each grating for each range. For example as shown in FIGS. 3A–3C, the grating 46' of the second grating unit 18 is additionally compressed to compensate for the $2\delta\lambda$ offset.

In the scanning mode, the tunable range 58 of the optical filter 10 can be sequentially scanned to provide at the output port 36 of the circulator 20 each optical channel within the tunable range of the optical filter. This mode of operation is applicable to optical channel analyzers (OCAs) and optical receivers. Typical applications in communications require tunability over a range of >35 nm for the "C" (conventional) band of the Er window (1525–1560) or the "L" (long) band. More recent applications require that both the "C" and "L" bands be monitored or conditioned, thereby doubling the required monitoring range. The present invention provides an OCA approach that extends the monitoring range by using two sets of tuned multi-component gratings having a limited tuning range that can be aligned and scanned synchronously.

Figure 4:
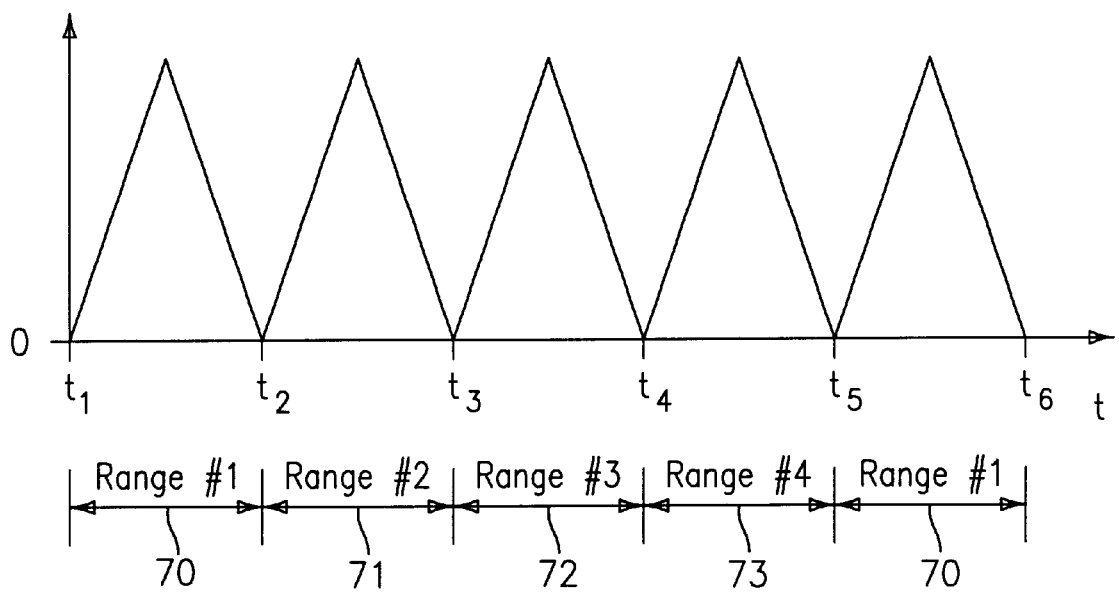
FIG. 4 is a graphical representation of a control signal for tuning the first grating element of the tunable optical filter, in accordance with the present invention.
Figure 5:
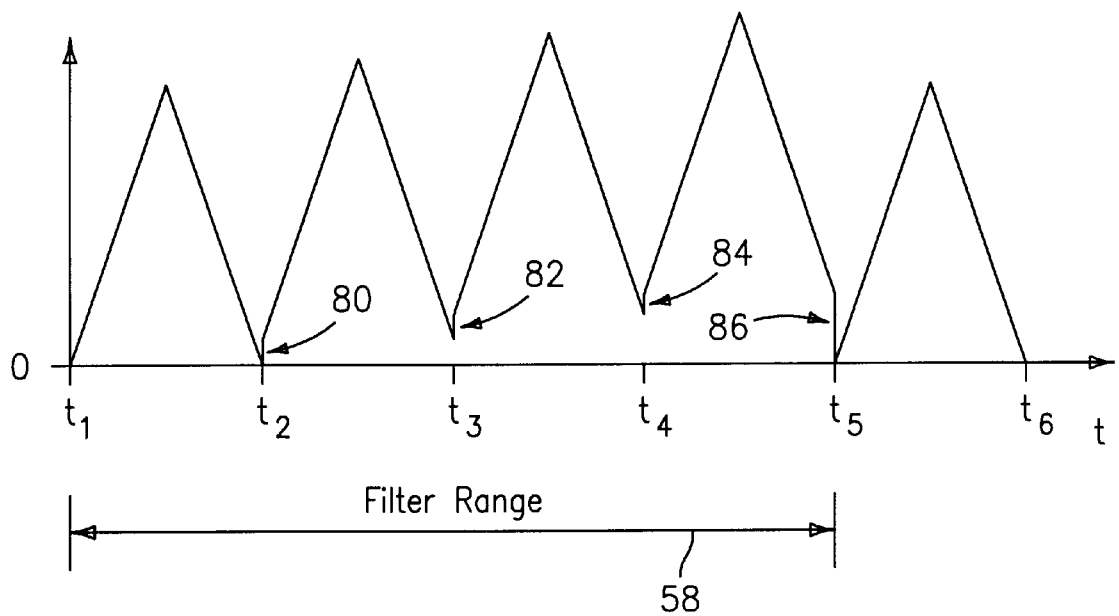
FIG. 5 is a graphical representation of a control signal for tuning the second grating element of the tunable optical filter, in accordance with the present invention.

FIG. 4 is representative of the control signal at 99 (FIG. 8) provided to tunable grating unit 16 for tuning the gratings 44–47 during the scanning operation. FIG. 5 is representative of the control signal at 99 provided to tunable grating unit 18 for tuning the gratings 44'–47' during the scanning operation. The compression force applied to the grating elements 40, 42 is proportional to the control signal.

The following describes the scanning operation for scanning from the lower wavelength range 70 to the upper wavelength range 73. One will appreciate, however, that the tunable range may also be similarly scanned from the upper wavelength range to the lower wavelength range.

Referring to FIGS. 4 and 5, no compression force is provided initially to the grating elements 40, 42 at time t1. The filter functions 50, 50' of the first complementary gratings 44, 44', therefore, are aligned at reflection wavelength $\lambda_{a1}$ at time t1 (see FIGS. 2A–2C). As the compression force is simultaneously and equally increased to the grating elements 40, 42, the first complementary gratings 44, 44' remain aligned and scan the first range to output sequentially the corresponding wavelengths. After the first range 70 is completely scanned in one direction, the compression force is simultaneously and equally reduced to the grating elements 40, 42 to rescan the first range back to the reflection wavelength $\lambda_{a1}$ to complete the scanning of the first range at time t2.

At time t2 after scanning the first range 70, the second grating element 42 is additionally compressed to align the complementary filter functions 51, 51 ' at the reflection wavelength $\lambda_{a2}$ prior to scanning the second range 71 of channels, as evidenced by the step 80 in compression force at time t2 in FIG. 5. The grating elements 40, 42 are then simultaneously and equally compressed, such that the gratings 45, 45' remain aligned and scan the second range to output sequentially the corresponding wavelengths. After the second range is completely scanned in one direction, the compression force is simultaneously and equally reduced to the grating elements 40, 42 to rescan the second range back to the reflection wavelength $\lambda_{a2}$ to complete the scanning of the second range at time t3.

At time t3 after scanning the second range 71, the second grating element 42 is additionally compressed to align the complementary filter functions 52, 52' at the reflection wavelength $\lambda_{a3}$ prior to scanning the third range 72 of channels, as evidenced by the step 82 in compression force at time t3 in FIG. 5. The grating elements 40, 42 are then simultaneously and equally compressed, such that the gratings 46, 46' remain aligned and scan the third range to output sequentially the corresponding wavelengths. After the third range is completely scanned, the compression force is simultaneously and equally reduced to the grating elements 40, 42 to rescan the third range back to the reflection wavelength $\lambda_{a3}$ to complete the scanning of the third range at time t4.

At time t4 after scanning the third range 72, the second grating element 42 is additionally compressed to align the complementary filter functions 53, 53' at the reflection wavelength $\lambda_{a4}$ prior to scanning the fourth range 71 of channels, as evidenced by the step 84 in compression force at time t4 in FIG. 5. The grating elements 40, 42 are then simultaneously and equally compressed, such that the gratings 47, 47' remain aligned and scan the fourth range to output sequentially the corresponding wavelengths. After the fourth range is completely scanned in one direction, the compression force is simultaneously and equally reduced to the grating elements 40, 42 to rescan the fourth range back to the reflection wavelength $\lambda_{a4}$ to complete the scanning of the fourth range at time t5.

At time t5, the compression force on the second grating element 42 is reduced to align the complementary filter functions 50, 50' at the reflection wavelength $\lambda_{a1}$ prior to re-scanning the first range 70 of channels, as evidenced by the step 86 in compression force at time t4 in FIG. 5.

Figure 6:
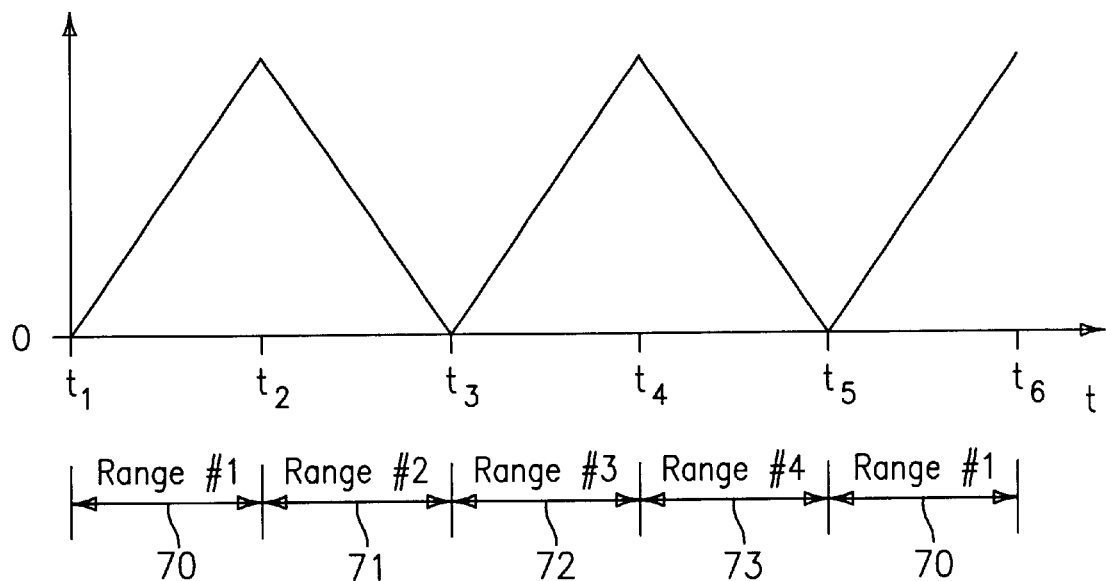
FIG. 6 is a graphical representation of a control signal for tuning the first grating element of the tunable optical filter, in accordance with another embodiment of the present invention.
Figure 7:
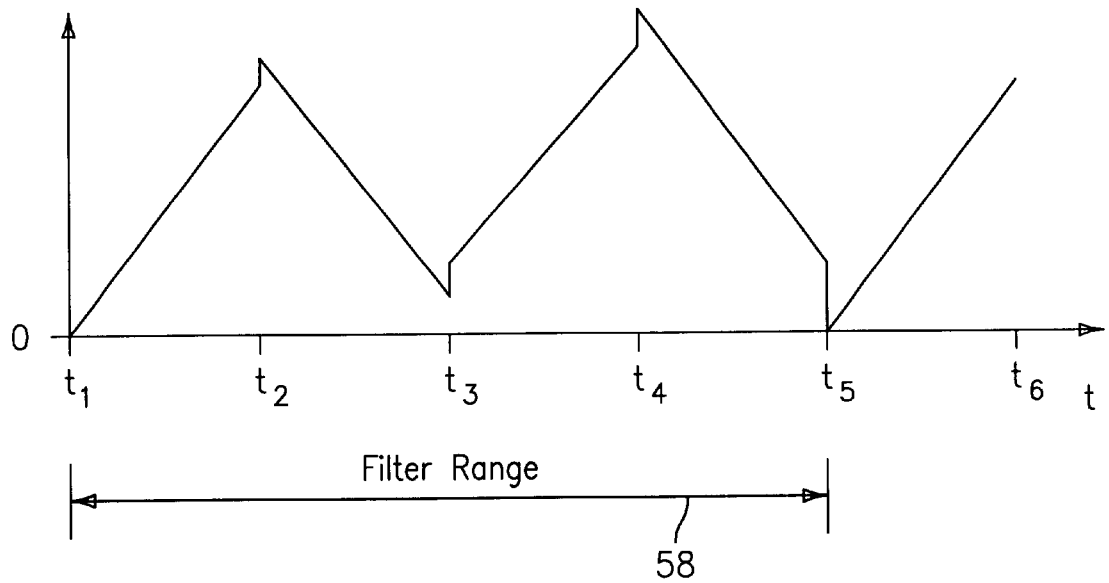
FIG. 7 is a graphical representation of a control signal for tuning the second grating element of the tunable optical filter, in accordance with another embodiment of the present invention.

One will appreciate that other tuning algorithms may be used to scan the spectral width of the optical filter 10. For example, referring to FIGS. 6 and 7, the control signal at 99 (FIG. 8) provided to each respective tunable grating unit 16, 18 for tuning the gratings during an alternative scanning operation is shown. Specifically, FIG. 6 is representative of the control signal provided to grating unit 16, and FIG. 7 is representative of the control signal provided to grating unit 18. Generally, the grating units are tuned to sequentially scan each range of wavelengths once beginning at tuning range 1 and ending at tuning range 4. Tuning ranges 1 and 3 of the wavelengths are scanned from the highest wavelength to the lowest wavelength, while the tuning ranges 1 and 4 are scanned from the lowest to highest wavelength.

While the tunable optical filter 10 described hereinabove includes grating elements 40, 42 having four gratings 44–47, 44'–47', one will appreciate that any number of gratings may be used. For example in another embodiment, the tunable optical filter 10 may be tunable over both the "C" and "L" bands using, for example, eight (8) gratings in each tuned grating element 40, 42. The detector signal 14 could be split using a simple filter (e.g., thin film) to allow the "C" and "L" bands to be separately monitored.

To provide the necessary accuracy to precisely tune the gratings 44–47, 44'–47', the tunable grating units 16, 18 are compression-tuned using a non-optical closed control loop. The compression-tuned grating units 16, 18, as will be described in greater detail hereinafter, are similar to that disclosed in co-pending U.S. patent application Ser. No. 09/456,112 entitled "Compression Tuned Bragg Grating and Laser", filed Dec. 6, 1999, and co-pending U.S. patent application Ser. No. 09/455,868 entitled "Large Diameter Optical Waveguide, Grating, and Laser", which are incorporated herein by reference in their entirety.

Figure 8:
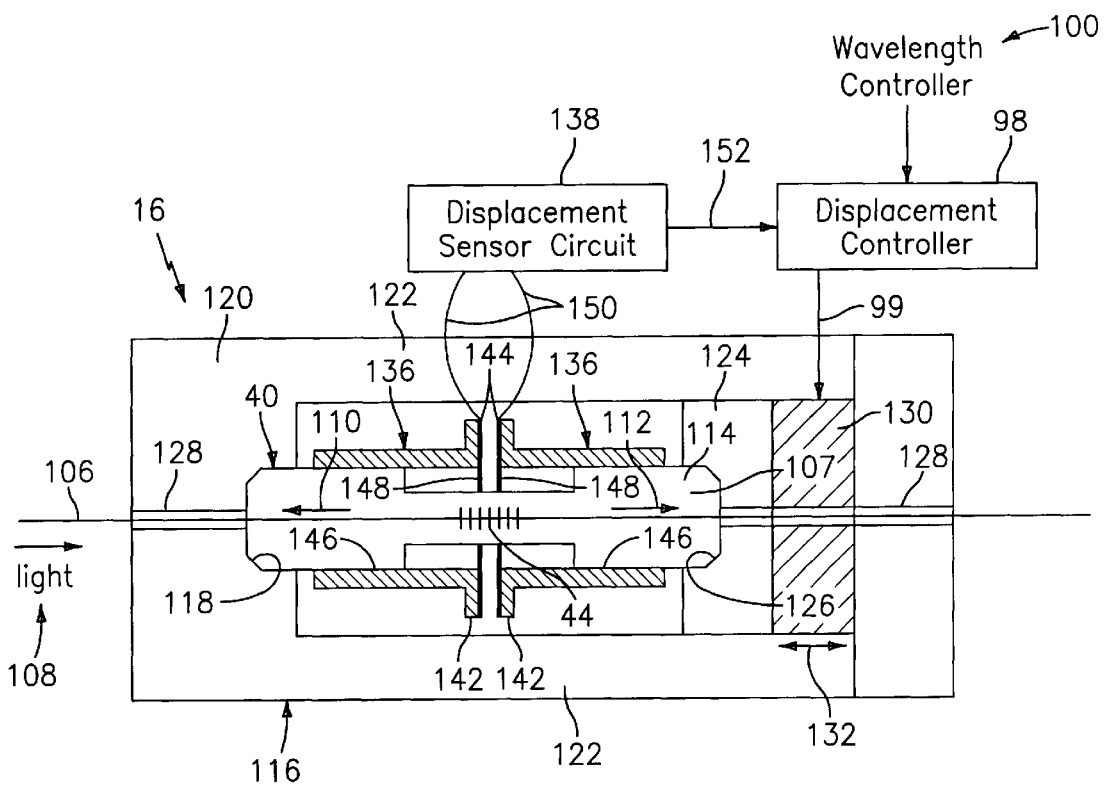
FIG. 8 is a side view of a tunable grating unit of a tunable optical filter and a block diagram of a positional/force feedback control circuit in accordance with the present invention.

FIG. 8 illustrates one of the two similarly constructed, compression-tuned Bragg grating units 16, 18 of FIG. 1, such as grating unit 16. The following description of grating unit 16 also applies to grating unit 18. The optical grating element 40 provided in the compression-tuned Bragg grating unit 16 may be a bulk or large diameter optical waveguide, having an outer cladding 114 and an inner core 107. The grating element 40 has an outer diameter of at least 0.3 mm and comprises silica glass ($SiO_2$) having the appropriate dopants, as is known, to allow light 108 to propagate along the inner core 107. The grating element (large diameter optical waveguide) may be formed by using fiber drawing techniques now know or later developed that provide the resultant desired dimensions for the core and the outer dimensions discussed hereinbefore, similar to that disclosed in co-pending U.S. patent application Ser. No. 09/455,868 entitled "Large Diameter Optical Waveguide, Grating, and Laser". The grating element may then be etched, grounded or machined to form a "dogbone" shape, as will be described in greater detail hereinafter. A pair of fibers or "pigtails" 106 may be attached to the ends of the grating element 40 by known techniques, such as epoxy or glass fusion)

Alternatively, the optical grating element 40 may be formed by heating, collapsing and fusing a glass capillary tube to a fiber (not shown) by a laser, filament, flame, etc., as is described in copending U.S. patent application Ser. No. 09/455,865, entitled "Tube-Encased Fiber Grating", which is incorporated herein by reference. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

A Bragg grating 44 is written (embedded or imprinted) into the inner core 107 of the grating element 40. The Bragg grating 44 reflects a portion the light 108 as indicated by a line 110 having a predetermined wavelength band of light centered at a reflection wavelength $\lambda_b$, and passes the remaining wavelengths of the incident light 108 (within a predetermined wavelength range), as indicated by a line 112. The grating, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention.

However, any wavelength-tunable grating or reflective element 44 embedded, written, etched, imprinted, or otherwise formed in the inner core 107 may be used if desired. As used herein, the term "grating" means any of such reflective elements. Further, the reflective element (or grating) 44 may be used in reflection and/or transmission of light.

Other materials and dimensions for the optical element 40 may be used if desired. For example, the grating element 40 may be made of any glass, e.g., silica, phosphate glass, or other glasses, or made of glass and plastic, or solely plastic.

The grating element 40 is axially compressed by a compression device or housing 116. One end of the grating element 40 is pressed against a seat 118 in one end 120 of the housing 116. The housing also has a pair of arms (or sides) 122, which guide a movable block 124. The block 124 has a seat 126 that presses against the other end of the grating element 40. The axial end faces of the grating element 40 and/or the seats on mating surfaces 118, 126 may be plated with a material that reduces stresses or enhances the mating of the grating element 40 with the seat on the mating surfaces. The ends of the housing 116 and the block 124 have a bore 128 drilled through them to allow the fiber 106 to pass therethrough. Instead of the recessed seats 118, 126, the end 120 of the housing 116 and the block 124 may provide a planar surface for engaging flush with the respective ends of the grating element 40.

The housing 116 may be assembled such that a pre-strain or no pre-stain exists on the grating element 40 prior to applying any outside forces.

An actuator 130, such as a piezoelectric actuator, engages the moveable block 124, which causes the block to move as indicated by arrows 132. Accordingly, the PZT actuator 130 provides a predetermined amount of force to the moving block 124 to compress the grating element 40, and thereby tune the gratings 44–47 to desired reflection wavelengths. In response to control signal generated by a displacement control circuit 98 via conductor 99, the PZT actuator 130 is energized to provide the appropriate compression force necessary to tune the grating element to the desired Bragg reflection wavelengths of the gratings 44–47. The control circuit 98 adjusts the expansion and retraction of the actuator 130 in response to an input command 100 and a displacement sensor 130 that provides feedback representative of the strain or compression of the grating element 40 to form a non-optical closed-loop control configuration. In other words, light 108 propagating through the network or device is not used to provide feedback for the tuning of the grating 44.

In an alternative embodiment, it may be possible to include both grating elements in one actuator assembly, with a secondary (piezoelectric actuator, for example) actuator to offset just one of the elements with respect to the other.

In one embodiment, the displacement sensor 134 includes a pair of capacitive elements 136 and a displacement sensor circuit 138, similar to that disclosed in co-pending U.S. patent application Ser. No. 09/519,802 entitled, "Tunable Optical Structure Featuring Feedback Control", filed Mar. 6, 2000, which is incorporated by reference in its entirety. As shown in FIG. 8, each capacitive element 136 is generally tubular having an annular ridge 142 extending radially outward from an end, which provides a capacitive surface 144. The capacitive elements 136 are mounted to respective ends of the grating element 40 at 146 such that the capacitive surfaces 144 are spaced a predetermined distance apart, for example, approximately 1–2 microns. Other spacings may be used if desired. The capacitive elements 136 may be bonded or secured using an epoxy or other adhesive compound, or fused to grating element 40 using a $CO_2$ laser or other heating element. The capacitive surfaces 144 are coated with a metallic coating, such as gold, to form a pair of annular capacitive plates 148. The change in capacitance depends on the change in the spacing between the capacitive plates.

Electrodes 94 are attached to the capacitive plates 148 to connect the capacitor to the displacement sensor circuit 138. The sensor circuit 138 measures the capacitance between the capacitive plates 148; and provides a sensed signal 152, indicative of the measured capacitance, to the displacement controller 98. As the grating element 40 is strained, the gap between the parallel capacitive plates 148 will vary, thereby causing the capacitance to change correspondingly. Specifically, as the gratings 44–47 are compressed, the gap between the capacitive plates 148 is reduced, resulting in an increase in capacitance. The change in capacitance is inversely proportional to the change in the reflection wavelength $\lambda_B$ of the gratings 44–47. Since the capacitive elements 136 are directly connected to the grating element 40, the capacitive elements are passive and will not slip. One skilled in the art would be able to implement without undue experimentation, the sensor electronics circuit 138 to measure the change in capacitance between the two capacitive plates 148.

In the operation of the grating unit 16, the controller 98 receives the wavelength input signal 100, which represents the desired reflection wavelength to tune the grating unit. In response to the input signal 100 and the sensed signal 152, which is representative of the present reflection wavelengths of the gratings 44–47, the controller 98 provides a control signal to the actuator 130 to increase or decrease the compression force applied to the grating element 40 to set the desired reflection wavelengths of the gratings 44–47. The change in applied force to the grating element 40 changes the spacing between the ends of the gratings 44–47, and therefore, the spacing between the capacitive plates 148. As described above, the change in spacing of the capacitive plates 148 changes the capacitance therebetween provided to the sensor circuit 138, which provides displacement feedback to the controller 98. While the sensor circuit 138 and the controller 98 has been shown as two separate components, one would recognize that the functions of these components may be combined into a single component. One example of a closed loop actuator 130 that may be used is Model No. CM (controller) and DPT-C-M (for a cylindrical actuator) made by Queensgate, Inc. of N.Y.

Although the invention has been described with respect to using a capacitor to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of the grating elements, one should recognize that the grating units may be accurately and repeatably compression and thus operating in an open loop mode.

Alternatively, instead of using a piezoelectric actuator 130, the grating element 40 may be compressed by another actuator, such as a solenoid, pneumatic force actuator, or any other device that is capable of directly or indirectly applying an axial compressive force on the grating element 40. Further, a stepper motor or other type of motor whose rotation or position can be controlled may be used to compress the grating element. A mechanical linkage connects the motor, e.g., a screw drive, linear actuator, gears, and/or a cam, to the movable block 124 (or piston), which cause the block 124 to move as indicated by arrows 132. The stepper motor may be a high resolution stepper motor driven in a microstepping mode, such as that described in the aforementioned U.S. Pat. No. 5,469,520, "Compression Tuned Fiber Grating", to Morey et al, (e.g., a Melles Griot NANOMOVER), incorporated herein by reference.

Figure 9:
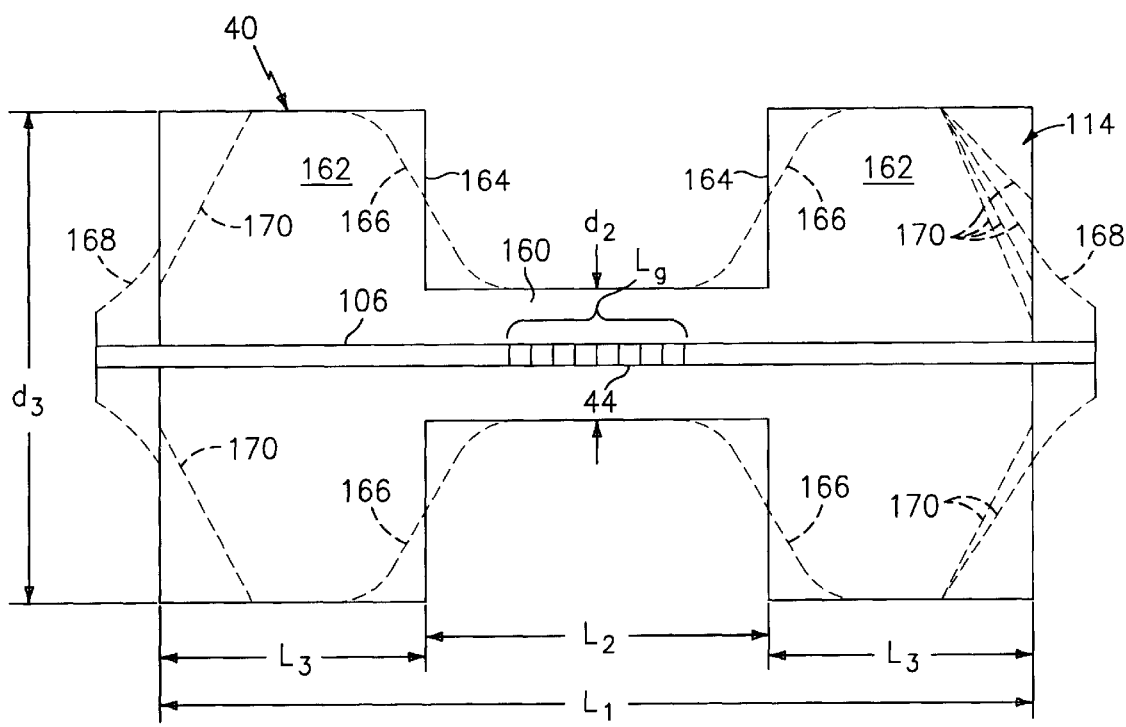
FIG. 9 is a side view of a grating element of a tunable optical filter in accordance with the present invention.

As shown in FIG. 9, the grating element 40 may have a "dogbone" shape having a narrow central section 160 and larger outer sections 162. Advantageously, the dogbone shape provides increased sensitivity in converting force applied by the actuator 130 to wavelength shift of the multi-component grating to assure accurate tuning of the gratings 44–47. The narrow section 160 may have an outer diameter d2 of about 8–1 mm, and a length L2 of about 5–20 mm. The large sections 162 each have a diameter d3 of about 3 mm and a length L3 of about 2–5 mm. The overall length L1 is about 10–30 mm and the multi-component grating has a length Lg of about 5–20 mm. Other lengths and diameters of the sections 160, 162 may be used. Other dimensions and lengths for the grating element 40 and the multi-component grating may be used.

An inner transition region 164 of the large sections 162 may be a sharp vertical or angled edge or may be curved as indicated by dashed lines 166. A curved geometry has less stress risers than a sharp edge and thus may reduce the likelihood of breakage. Also, the large sections 162 of the tube 114 may have the outer fluted sections 168 at the ends of the tube 114. Further, the large sections 162 may have the tapered (or beveled) outer corners 170.

We have found that such a dimension change between the dimension d3 of the large section 162 and the dimension d2 of the narrow section 160 provides increased force to grating wavelength shift sensitivity (or gain or scale factor) by strain amplification. Also, the dimensions provided herein for the dogbone are easily scalable to provide the desired amount of sensitivity.

The dimensions and geometries for any of the embodiments described herein are merely for illustrative purposes and, as such, any other dimensions may be used if desired, depending on the application, size, performance, manufacturing requirements, or other factors, in view of the teachings herein.

The grating element 40 may have tapered (or beveled or angled) outer corners or edges 170 to provide a seat for the tube to mate with housing 116 and moving block 124 and/or to adjust the force angles on the grating element, or for other reasons. The angle of the beveled corners 170 is set to achieve the desired function. In addition, one or both of the axial ends of the grating element 40 where the fiber 106 attaches may have an outer tapered (or fluted, conical, or nipple) axial section, shown as dashed lines 168.

Alternatively, the gratings 44–47, 44'–47' may be tuned by mechanically stressing (i.e. tension, bending) the grating elements, or varying the temperature of the grating (i.e., using a heater), such as that described in U.S. Pat. No. 5,007,705, entitled "Variable Optical Fiber Bragg Filter Arrangement", to Morey et al., which is incorporated herein by reference, provided the gratings may be tuned precisely to accurately align the filter functions relative to each other. Furthermore, while gratings 44–47, 44'–47' have been described as being within grating elements 16, 18 in the form of a bulk waveguide, one will appreciate that the gratings may be written into a fiber, wherein grating may be tuned thermally or mechanically (compression or tension).

The Bragg gratings 44–47 may be written in the fiber 106 before or after the capillary tube 164 is encased around and fused to the fiber, such as is discussed in copending U.S. patent application Ser. No. 09/205,943 (CiDRA Docket No. CC-0078), which is incorporated herein by reference. If the grating 44 is written in the fiber 106 after the tube 114 is encased around the grating, the grating may be written through the tube into the fiber by any desired technique, such as is described in copending U.S. patent application Ser. No. 09/205,845 (CiDRA Docket No. CC-0130), entitled "Method and Apparatus For Forming A Tube-Encased Bragg Grating", filed Dec. 4, 1998, which is incorporated herein by reference.

Another advantage of the present invention is the ability to create or tailor the effective filter function of the tunable optical filter 10 of FIG. 1. This feature enables the optical filter 10 to achieve the best properties of two different types of gratings. For example, the grating elements 40, 42 of the optical filter 10 may be impressed with two sets of gratings 44–47, 44'–47' respectively, having different grating characteristics. With this approach, the effective filter function of the optical filter 10 can be achieved which would be very difficult or impossible to produce with a single grating. In an embodiment of the present invention, the gratings 44–47 of the first grating element 40 may be fully apodized when written while the other grating 44'–47' of the second grating element 42 may be only partially apodized, by known techniques. One will appreciate that the first grating element 40 may be partially apodized while the second grating element 42 may be fully apodized, provided the side bands of the partially apodized grating element does not extend to the adjacent filter functions.

Figure 10:
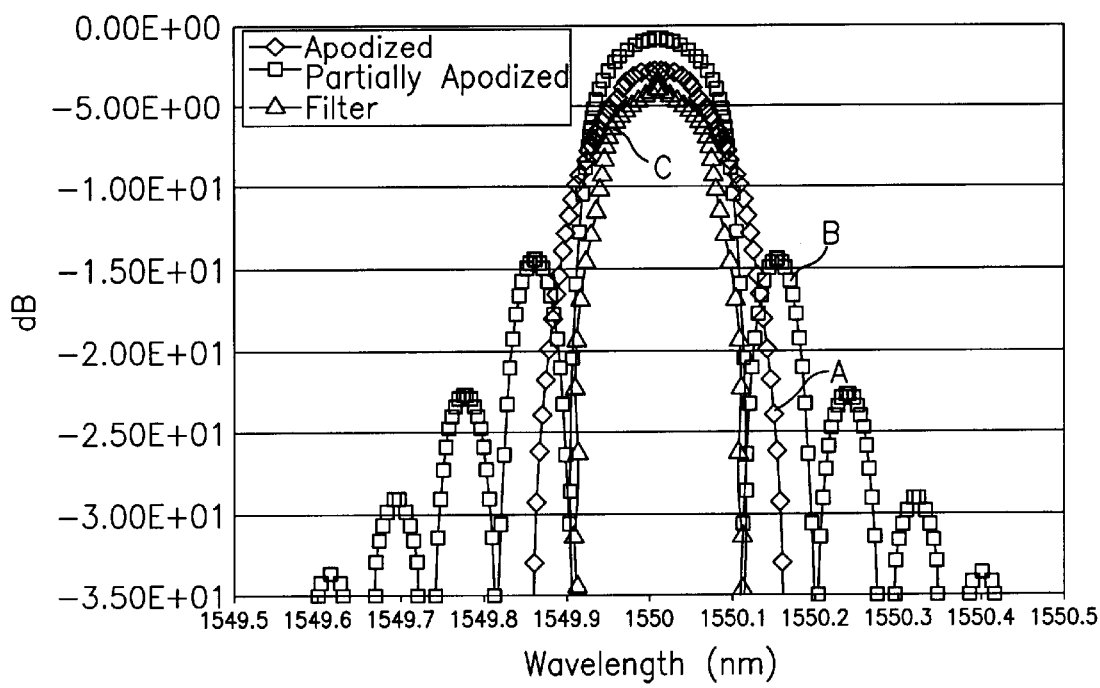
FIG. 10 is a graphical representation of the effective filter function of the tunable optical filter of FIG. 1, and the filter functions of the grating elements of the tunable optical filter of FIG. 1.

A graph shown in FIG. 10 illustrates of the filter function (Plot A) of a fully apodized grating 44, the filter function (Plot B) of a partially apodized grating 44', and the effective filter function (Plot C) of the tunable optical filter 10 including the fully apodized grating and the partially apodized grating. Each grating unit is modeled to be an 11 mm grating, both having the same properties of grating length and index modulation. The filter functions are superimposed on the graph centered about the reflection wavelength of 1550 nm. The X-axis represents the wavelength (nm) of the light and the Y-axis of the graph represents the attenuation of the optical signal in decibels (dB).

Referring to Plot A, the grating characteristics of the fully apodized grating include a main peak centered at the reflection wavelength of 1550 nm having a relative wide grating with a FWHM of ~0.15 nm, however, the grating provides substantial suppression (~30 dB) of the sidebands. In contrast, referring to Plot B, the grating characteristics of the partially apodized grating include a very narrow main peak centered about the reflection wavelength of 1550 nm having an extremely fast rolloff of the main peak. The sidebands, however, are minimally suppressed. As described above the effective filter function of the tunable filter function, as a whole, is the product of the filter functions of the gratings 44, 44' as shown in Plot C. When the product is taken of the two filter functions of the two gratings 44, 44', the result is a very narrow grating with a FWHM ~0.1 nm and ~30 dB rolloff at 0.1 nm from the peak centered about the reflection wavelength λ of 1550 nm. Consequently, the present invention, having a pair of different gratings, takes advantage of the best properties of the two gratings, namely the very narrow main peak and the substantial suppression of the sideband wavelengths.

The effective filter function 49 of the tunable optical filter 10 of FIG. 1 may be further tailored by offsetting the complementary gratings (i.e., 44, 44'). For example, the gratings 44, 44' of the tunable optical filter 10 of FIG. 1 may be centered at different reflection wavelengths $\lambda_A$, $\lambda_B$ such that the filter functions 47', 48' of the gratings are slightly offset to create a very narrow effective filter function 49' for the optical filter 10, as shown in FIG. 11.

Figure 11:
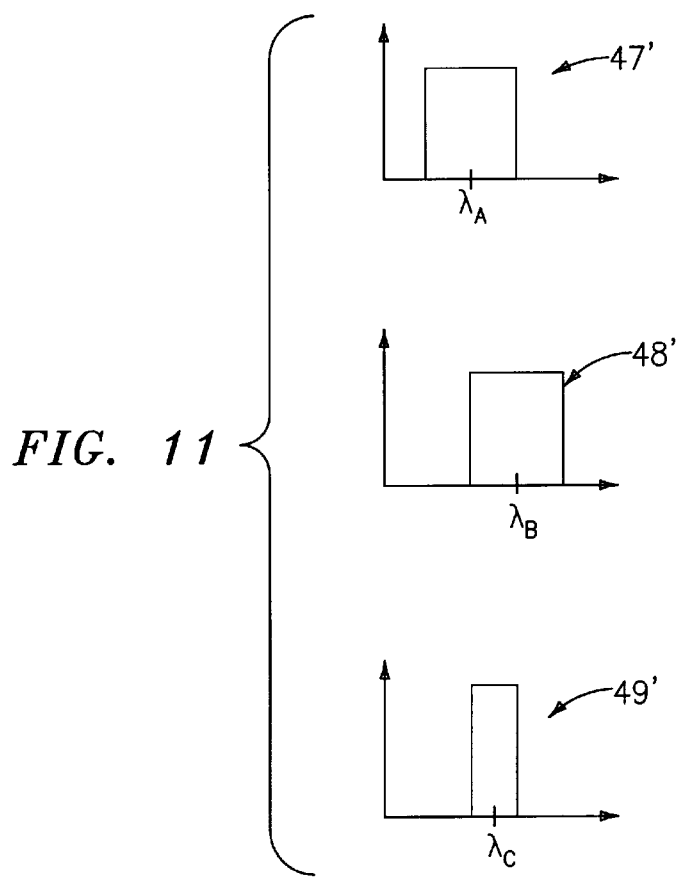
FIG. 11 is a graphical representation of the filter functions of the grating elements of the tunable optical filter of FIG. 1, and the resulting effective filter function of the optical filter, wherein the reflection wavelength of the pair of gratings are offset.

FIG. 11 is illustrative of the filter functions 47', 48' of each of the gratings (i.e., 44, 44') and the resulting effective filter function 49' of the optical filter 10. The filter function 47 of one of the gratings (i.e., 44) comprises a relatively broad wavelength band having a generally rectangular profile, centered about reflection wavelength $\lambda_A$. The filter function 48 of the other grating (i.e., 44') comprises a relatively broad wavelength band having a generally rectangular profile, centered about reflection wavelength $\lambda_B$, which is offset from wavelength $\lambda_A$. The offset is such that a desired portion of the filter functions 47', 48' overlap. In accordance with the double reflection technique described hereinbefore, the effective filter function is the product of the filter functions 47', 48' of the gratings 44, 44'. Consequently, the resulting effective filter function 49' of the optical filter 10 comprises a narrow wavelength band, centered about the reflective wavelength $\lambda_C$, which is disposed between the reflection wavelengths $\lambda_A$, $\lambda_B$. The width of narrow wavelength band of the effective filter function 49' is defined by the offset of reflection wavelengths $\lambda_A$, $\lambda_B$.

As noted above, the reflection characteristics of the resulting effective filter function are dependent on the characteristics of the gratings and the amount of offset between the center reflection wavelengths $\lambda_A, \lambda_B$ of the gratings 44, 46. For example as shown in FIG. 11, the pair of gratings 44, 44' having relatively broad wavelength bands with sharp edges may be used to provide a narrow wavelength band having sharp edges. It should be noted that this method relies on the ability to very precisely align the two gratings to the desired reflection wavelength to achieve the exact shape required, which is provided by the compression-tuned optical filter described hereinbefore, and is similar to that disclosed in co-pending U.S. patent application Ser. No. 09/456,112 entitled "Compression Tuned Bragg Grating and Laser", filed Dec. 6, 1999, which is incorporated herein by reference.

Figure 12:
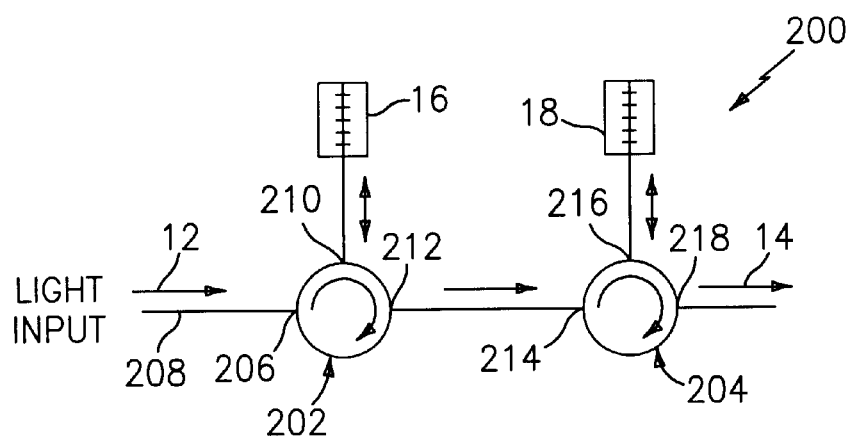
FIG. 12 is a block diagram of another embodiment of a tunable optical filter in accordance with the present invention.

Referring to FIG. 12, one will appreciate that the 4-port circulator 20 of the optical filter 10 of FIG. 1 may be substituted for a pair of 3-port circulars 202, 204 optically connected in series. A first port 206 of the first circulator 202 receives the input light 12 propagated/transmitted through optical fiber 208. The first tunable grating unit 16 is optically connected to a second port 210 of the first circulator. The third port 212 of the first circulator 202 is optically connected to the first port 214 of the second circulator 204. The second tunable grating unit 18 is optically connected to a second port 216 of the second circulator 204.

In the operation of the tunable optical filter 200 of FIG. 12, the input light 12 is transmitted to the first port 206 of circulator 202. The circulator 202 directs the input light 12 in a clockwise direction from the first port 206 to the second port 210. The input light 12 exits the second port 210 and propagates to grating unit 16, which is tuned to reflect a plurality of selected wavelength bands of light back to the second port of circulator 202, and passes the remaining wavelength bands of light therethrough. The circulator 202 then directs the reflected wavelength bands of light to the third port 212. The reflected wavelength of light exits the third port 212 and propagates to the first port 214 of circulator 204. The circulator 204 directs the reflected wavelength to the second port 216 to grating unit 18, which is tuned to reflect a portion of the selected wavelength bands of the reflected light back to the second port 216. The circulator 204 directs the double reflected light from the second port 216 to a third port 218 and exits circulator 204.

While FIG. 12 illustrates various configurations to take advantage of various filtering properties or characteristics of the multiple gratings to create a desired effective filtering function, one will appreciate that a number of configurations using a number of different gratings and circulators is possible. For example, four grating units may be optically connected to four respective ports of a 6-port circulator, similar to the configuration of the optical filter of FIG. 1.

Figure 13:
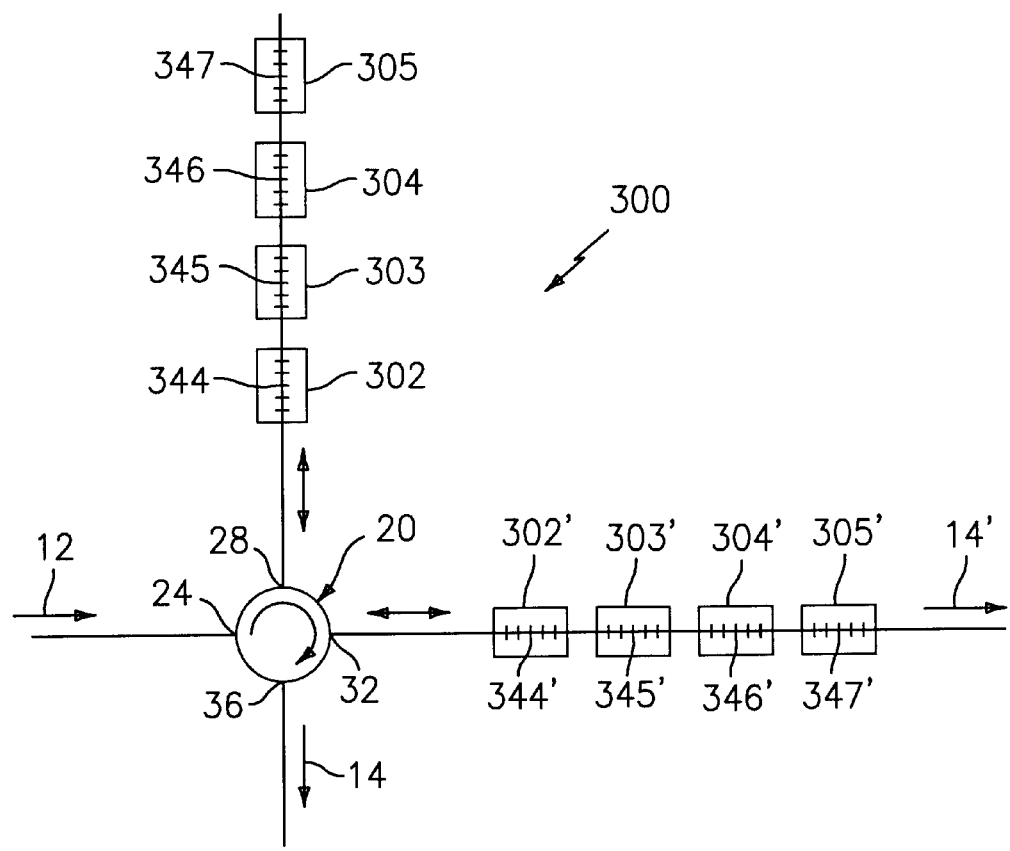
FIG. 13 is a block diagram of another embodiment of a tunable optical filter in accordance with the present invention.

In FIG. 13, another embodiment of the tunable optical filter 300 is shown. The optical filter 300 is similar to that shown in FIG. 1, except each of the gratings 344–347, 344'–347' are written in independent grating elements 302–305, 302'–305', optically connected in series, and are independently tunable. In the following description of the optical filter 300, components and features common to the previously described embodiments have the same reference numbers, and therefore are not described in detail.

Each of the individual gratings may be tuned to operate in a manner similar to the operation of the optical filter 10 described hereinbefore. The optical filter 300 takes advantage of the benefits the double reflection technique and further increases the possible filtering characteristics of the optical filter. For example, the reflection wavelengths of two pairs of complimentary gratings (i.e., 344, 344' and 346, 346') may be aligned to filter a pair of wavelengths bands from the input DWDM light.

Alternatively, the grating elements 302'–305' may be tuned to transmit or pass the desired wavelength band or bands 14', while reflecting and dropping the undesired wavelength band or bands through the fourth port 36 of the circulator 20. For example, one of the four wavelength bands reflected by the grating elements 302–305, may be filtered from the input light 12 by tuning grating elements (i.e., 302 and 302') to substantially misalign the respective filter functions to transmit the desired wavelength band, and tuning the other complimentary grating elements (i.e., 302–305, 302'–305') to substantially align the respective filter functions to reflect and drop the other wavelength bands.

Figure 14:
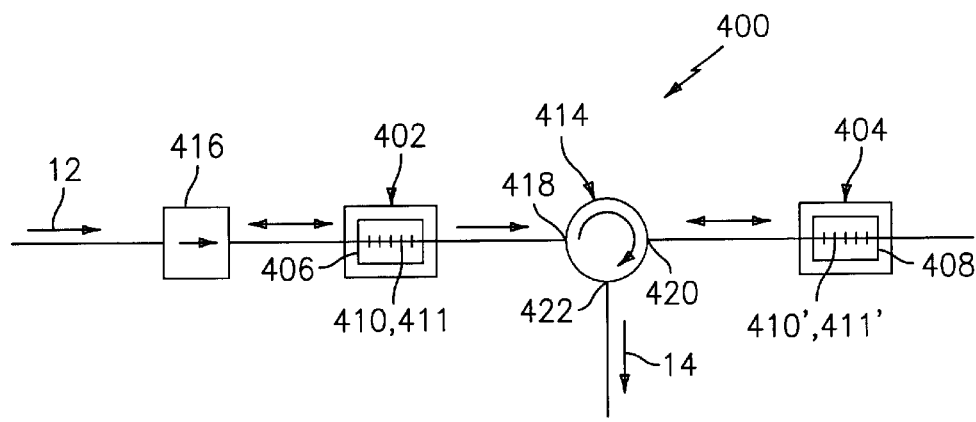
FIG. 14 is a block diagram of another embodiment of a tunable optical filter in accordance with the present invention.

FIG. 14 provides another embodiment of a tunable optical filter 400 illustrative of the present invention. The optical filter 400 includes a pair of tunable grating units 402, 404 similar to the grating units 16, 18 of FIG. 1, except each the respective grating elements 406, 408 has two gratings 410–411, 410'–411' written therein. The tunable grating units 402, 404 are optically connected by a three port circulator 414, wherein grating unit 402 functions in a transmission configuration and grating unit 404 functions in a reflection configuration. In other words, grating unit 402 is tunable to reflect a pair of undesired wavelength bands and transmitting the desired wavelength bands, while grating unit 404 is tunable to reflect a desired wavelength band and transmitting the undesired wavelength bands.

In the operation of the tunable optical filter 400, DWDM input light 12 tapped off an optical network (not shown), for example, is transmitted to grating unit 402. The grating unit 402 is tuned to reflect a pair of selected wavelength bands of light centered a reflection wavelengths $\lambda_{a1}$–$\lambda_{a2}$ (see FIGS. 15A–15B) back to the optical network. An optical isolator 416 is optically connected between the optical network and grating unit 402 to prevent the reflected wavelength bands from propagating back to the optical network. The other wavelength bands are transmitted or passed through the grating element 406 to the first port 418 of the circulator 414. The circulator 414 directs the transmitted wavelength bands in a clockwise direction to the second port 420. The transmitted wavelength bands exit the second port 420 and propagate to grating unit 404. The grating unit 404 is tuned to reflect a portion of one of the transmitted wavelength bands back to the second port 420, while passing the other reflected wavelength bands therethrough. The circulator 414 directs the reflected wavelength band of light to the third port 422 to provide the desired wavelength output band of light 14.

Figure 15A:
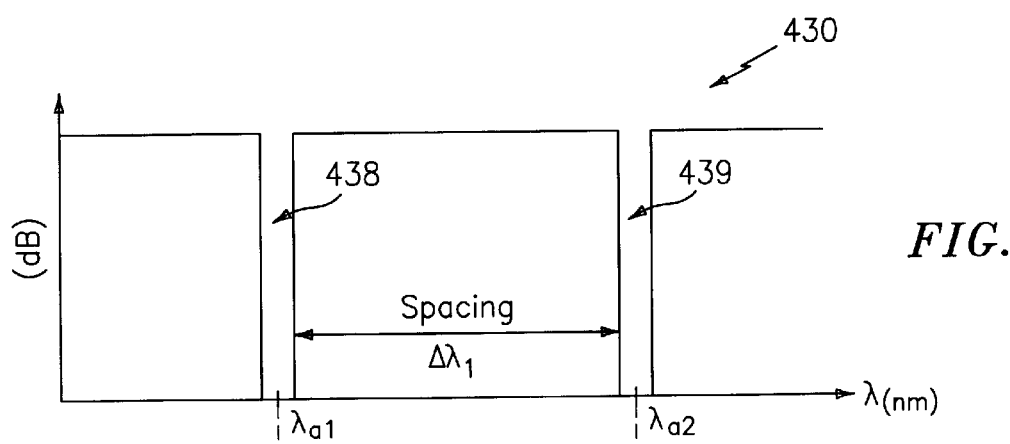
FIGS. 15A–15C are graphical representations of the effective filter function of the tunable optical filter of FIG. 14, and the filter functions of the grating elements of the tunable optical filter of FIG. 14.
Figure 15B:
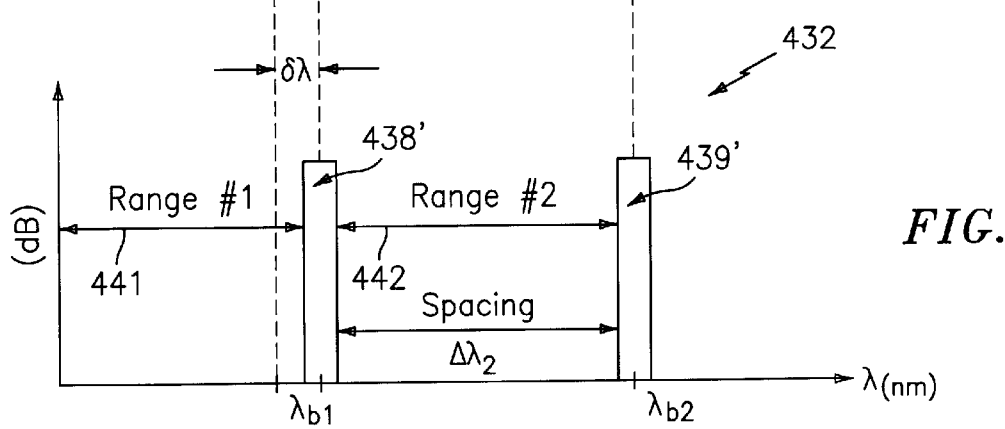

FIG. 15A provides a graphical representation 430 of the transmission characteristics of the tunable grating element 406. FIG. 15B provides a graphical representation 432 of the grating characteristics of the tunable grating element 408. FIG. 16C provides a graphical representation 434 of the grating characteristics of the resulting effective filter function 436 of the optical filter 400. Each of the graphs is aligned vertically to align the y-axis, which represents the attenuation in decibels (dB) of the filtering function of the grating elements 406, 408 and the optical filter 400. The x-axis represents the wavelength ($\lambda$) in nanometers (nm).

Referring to FIG. 15A, the transmission characteristics of the tunable grating element 402 is defined by two respective reflective optical filtering functions 438, 439 centered nominally at reflection wavelengths $\lambda_{a1}$,$\lambda_{a2}$ respectively, which correspond to the gratings 410–411 of grating element 406. The spacing between the reflection wavelengths of the gratings approximately represents the minimum tunable range of each grating.

Referring to FIG. 15B, the reflective characteristics of the tunable grating element 408 is defined by two optical filtering functions 438', 439' centered at reflection wavelengths $\lambda_{b1}$,$\lambda_{b2}$ respectively, which correspond to the gratings 410'–411' of grating element 408. The spacing ($\Delta\lambda_2$) between the reflection wavelengths $\lambda_{b1}$,$\lambda_{b2}$ of gratings 410, 411 is less than the spacing ($\Delta\lambda_1$) between the reflection wavelengths $\lambda_{a1}$,$\lambda_{a2}$ of gratings 410', 411' by an offset of $\delta\lambda$. In other words, spacing $\Delta\lambda_2$=$\Delta\lambda_1$–$\delta\lambda$. The spacing offset ($\delta\lambda$) assures that when the pair of grating elements 406, 408 are tuned to align a selected reflection wavelength (i.e., $\lambda_{a2}$,$\lambda_{b2}$) of a pair of complementary gratings (i.e., 411, 411'), the other reflection wavelengths (i.e., $\lambda_{a1}$,$\lambda_{b1}$) of the other complementary gratings (i.e., 410, 410') are offset.

Figure 15C:
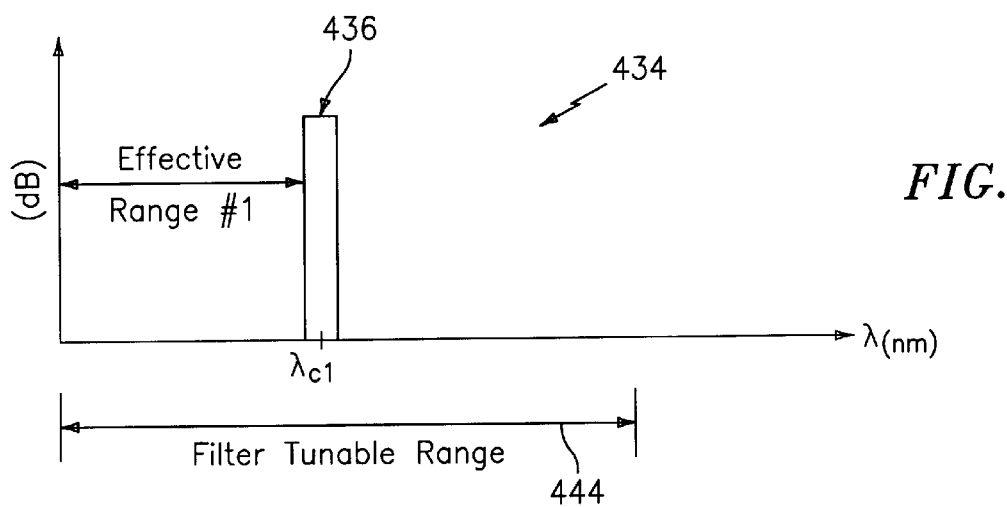

For example, referring to FIGS. 15A–15C, both the grating 411 of grating element 406 and the grating 411' of grating element 408 are tuned simultaneously to align the respective reflection wavelengths at $\lambda_{a2}$,$\lambda_{b2}$. When aligned, the reflection wavelengths $\lambda_{a1}$,$\lambda_{b1}$ of the gratings 410, 410' are offset. The offset $\delta\lambda$ is such that a sufficient spacing between the reflection wavelengths exists to prevent crosstalk or interference between adjacent gratings.

FIG. 2C is representative of the reflective characteristics of the tunable optical filter 400 that is defined by the effective filter function 436 centered at a reflection wavelength $\lambda_c$, which corresponds to the reflection wavelength $\lambda_{b1}$ of the filter functions 438'. The effective filter function 436 of the optical filter 400 is equivalent to the filter function 438' of grating 410', which is aligned with a portion of the transmission filter function 440 of gratings 410, 411.

Each of the pairs of complementary gratings 410–411, 410'–411' is tunable over a range of wavelengths. As shown in FIGS. 15A–15C, the fall tunable range of the optical filter 400 is broken down into two tunable ranges 441, 442 corresponding to the pair of complementary gratings. For example, the complementary gratings 410, 410' of the grating elements 406, 408 respectively, may be tuned simultaneously to filter the wavelength bands within the first range 441. The complementary gratings 411, 411' of the grating elements 406, 408 respectively, may be tuned simultaneously to filter the wavelength bands within the second range 442. FIG. 15C shows that the resulting effective filter function 436 has an effective tunable range 444 equal to the two ranges 441, 442 of each complementary pair of gratings, as described in greater detail hereinbefore.

One will recognize that the grating elements 406, 408 of optical filter 400 of FIG. 14 are limited to a pair of gratings 410–411, 410'–411' because the gratings of each grating element are simultaneously tuned, and thus the spacings between the gaps 438, 439 in the transmission filter function 440 of gratings 410, 411, and the spacings between the filter functions 438', 439' remain constant. Consequently, it is not possible to park more than one filter function (i.e., 438', 439') of grating element 408 in the gaps (i.e., 438, 439) of the filter function 440 of grating element 406, while tuning the optical filter over its full range 444.

Figure 16:
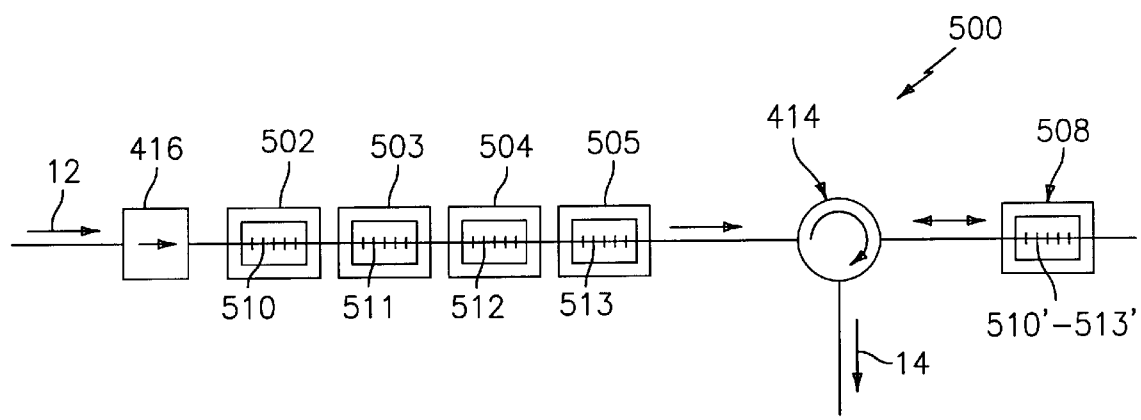
FIG. 16 is a block diagram of another embodiment of a tunable optical filter in accordance with the present invention.

FIG. 16 provides another embodiment of a tunable optical filter 500 similar to that shown in FIG. 14. In the following description of the optical filter 500, components and features common to the previously described embodiments have the same reference numbers, and therefore are not described in detail.

In contrast to the optical filter 400 of FIG. 14, the optical filter 500 provides a plurality of tunable grating units 502–505 optically connected to a tunable grating unit 508 by a three port circulator 414, wherein grating units 502–505 each have a single tunable grating 510–513 and grating unit 508 has a four complementary tunable gratings 510'–513'.

The operation of optical filter 500 is substantially similar to that of the operation of the tunable optical filter 400, as described hereinbefore. The difference in the operation is that four gratings (i.e., 510–513) may be independently tuned to align the selected transmission gaps (i.e., 438, 439) of the transmission profile (i.e., 440), as shown in FIGS. 15A–15C, with the reflection wavelengths of three complementary gratings (i.e., 511'–513'), and grating (i.e., 510) may be independently tuned to misalign its reflection wavelength and the reflection wavelength of the complementary grating (i.e., 510'). The capability to independently tuning gratings 510–513 provides a greater tunable range for optical filter 500 than possible by optical filter 400, as described hereinbefore.

Figure 17:
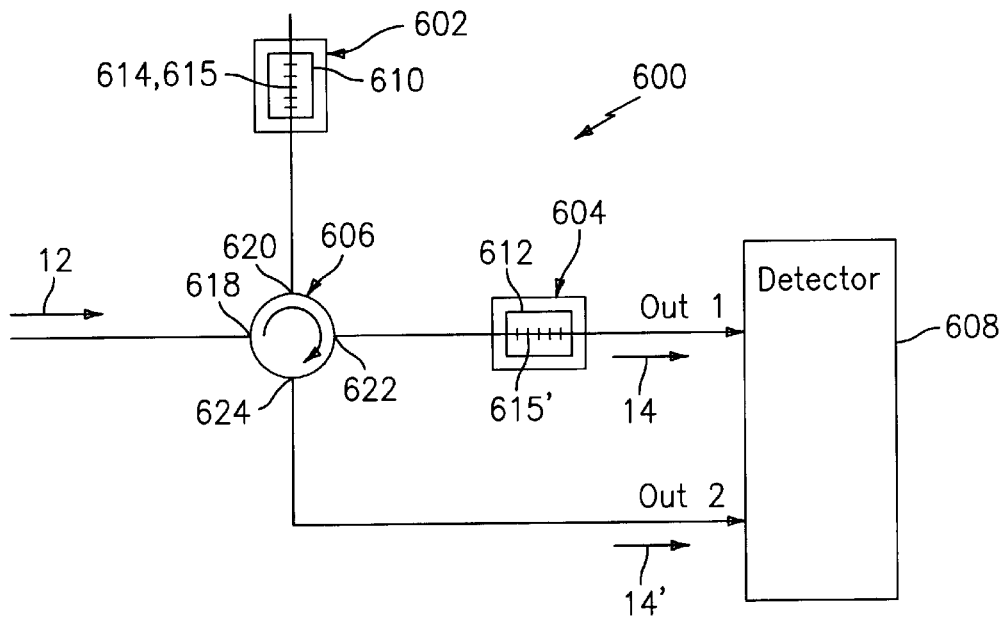
FIG. 17 is a block diagram of another embodiment of a tunable optical filter in accordance with the present invention.

In FIG. 17, another embodiment of a tunable optical filter 600 having a pair of tunable Bragg grating units 602, 604 is shown that filters an input light 12 to provide concurrently a pair of wavelength bands of light at a pair of respective output ports (Out1, Out2). The optical filter 600 is tunable to provide selected wavelength bands at output port 1 (Out1) over a first spectral range and provide selected wavelength bands at output port 2 (Out2) over a second spectral range, such that the combined first and second spectral ranges define the overall tunable range of the optical filter 600 (see FIGS. 18A–18C), as will described in greater detail hereinafter. In contrast to the repetitive tuning of the grating units 16, 18 of the optical filter 10 of FIG. 1 for scanning the overall tunable range of the optical filter, the pair of output ports advantageously permits the overall tunable range of the optical filter 600 to be scanned in a single scanning or tuning cycle of the grating units 602, 604.

The tunable Bragg grating units 602, 604 are optically coupled to respective ports of an optical directing device 606, such as a 4-port circulator. An optical wavelength detector 608 may be connected to the output ports of the filter 600 for detecting and analyzing specific parameters (i.e., signal-to-noise ratio, power frequency, power density, etc.) of the selected wavelength bands of light 14, 14'.

Each grating unit 602, 604 tunes a respective grating element 610, 612 (i.e., optical waveguides), wherein grating element 610 includes a pair of Bragg gratings 614, 615 and grating element 612 includes a Bragg grating 615'.

Specifically, a first port 618 of the circulator 606 receives the input light 12. The light 12 may originate from a light source or light tapped off from an optical network (not shown). The circulator 606 directs the input light 12 in a clockwise direction to grating element 610 of the grating unit 602. The grating element 610 is tuned to reflect a pair of selected wavelength bands of the input light back to the circulator 606, and passes the remaining wavelengths of the input light through the grating element 610. The circulator 606 then directs the reflected wavelength bands to the grating element 612 of grating unit 604. The grating element 612 is simultaneously tuned to reflect a substantial portion of one of the reflected wavelength bands back to the circulator 606. The circulator directs the double reflected wavelength band 14' to the second output port (Out2). Concurrently, the other wavelength band 14 passes through grating element 615' to the first output port (Out1).

The reflective characteristics of the gratings 614–615, 615' are defined by their respective filter functions 630–631, 631' (see FIGS. 18A–18D). In one embodiment, the reflection wavelength $\lambda_{a2}$ of the filter function 631 of grating 615 is aligned simultaneously with a selected reflection wavelength $\lambda_{b2}$ of the filter function 631' of grating 615' to reflect a portion of the selected wavelength band, centered at reflection wavelength $\lambda_2$, while passing to the other wavelength band, centered at reflection wavelength $\lambda_{c2}$, while passing to the other wavelength band, centered at reflection wavelength $\lambda_{c1}$.

Figure 18A:
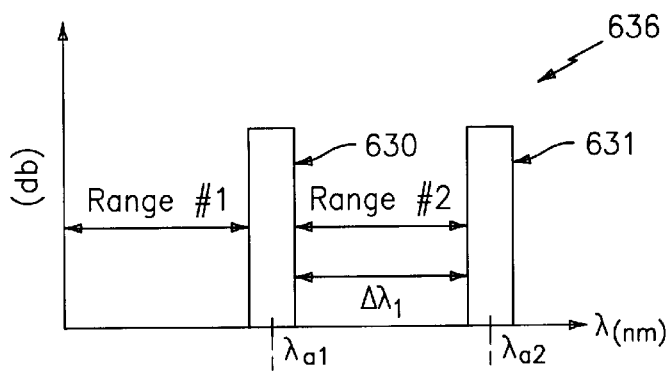
FIGS. 18A–18D are graphical representations of the effective filter function of the tunable optical filter of FIG. 17, and the filter functions of the grating elements of the tunable optical filter of FIG. 17.
Figure 18B:
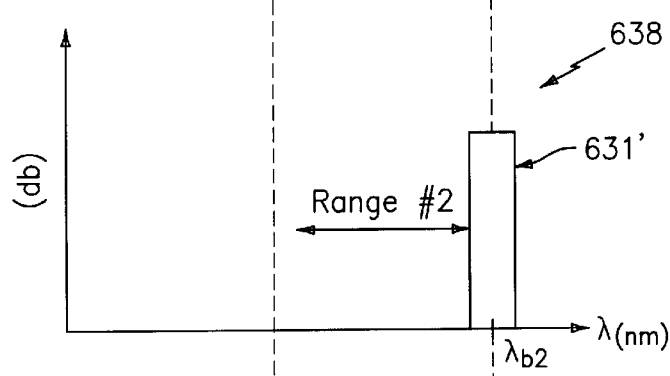
Figure 18C:
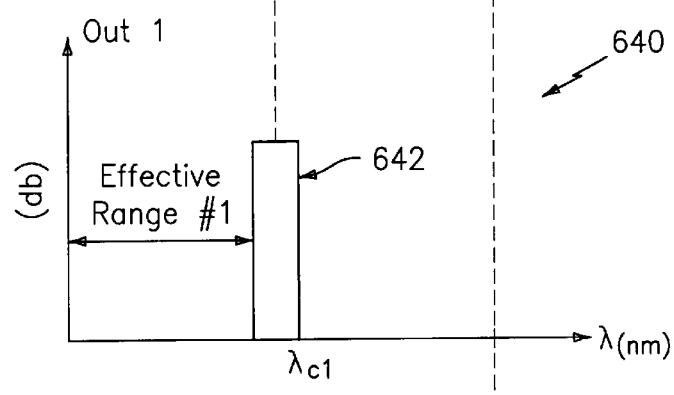
Figure 18D:
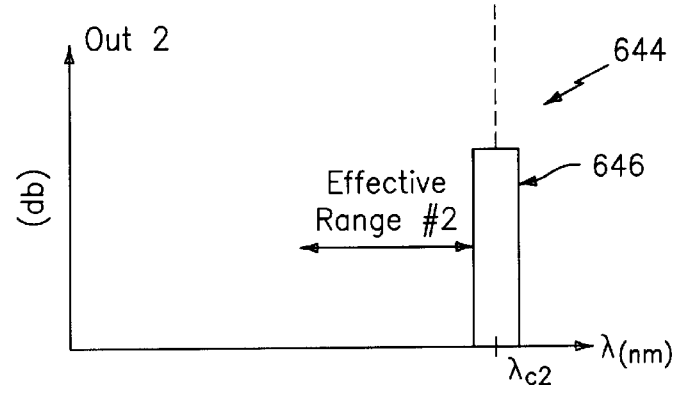

FIG. 18A provides a graphical representation 636 of the reflective characteristics of the first tunable grating element 610. FIG. 18B provides a graphical representation 638 of the grating characteristics of the second tunable grating element 612. FIG. 18C provides a graphical representation 640 of the grating characteristics of the resulting effective filtering function 642 of the optical filter 600 at the first output port (Out1). FIG. 18D provides a graphical representation 644 of the grating characteristics of the resulting effective filtering function 646 of the optical filter 600 at the first output port (Out2). Each of the graphs is aligned vertically to align the y-axis, which represents the attenuation in decibels (dB) of the filtering function of the grating elements 610, 612 and the optical filter 600. The x-axis represents the wavelength ($\lambda$) in nanometers (nm).

Referring to FIG. 18A, the reflective characteristics of the tunable grating element 610 is defined by two respective optical filtering functions 630, 631 centered nominally at reflection wavelengths $\lambda_{a1}, \lambda_{a2}$, respectively, which correspond to the gratings 614, 615 of grating element 610. The reflection wavelengths $\lambda_{a1}, \lambda_{a2}$ of the gratings 614, 615 are spaced (at spacing $\Delta\lambda_1$). The spacing between the reflection wavelengths of the gratings 614, 615 represents the minimum tunable range of each grating.

Referring to FIG. 18B, the reflective characteristic of tunable grating element 612 is defined by optical filtering function 631' centered at reflection wavelengths $\lambda_{b2}$. The complementary gratings 615, 615' are both tuned simultaneously to align substantially their respective reflection wavelengths the respective reflection wavelengths at $\lambda_{a1}$, $\lambda_{b1}$.

FIG. 2C is representative of the reflective characteristics of the tunable optical filter 600 at the first output port (Out1) that is defined by the effective filter function 642 centered at a reflection wavelength $\lambda_{c1}$, which corresponds to the reflection wavelength $\lambda_{a1}$ of the filter functions 630.

FIG. 2D is representative of the reflective characteristics of the tunable optical filter 600 at the second output port (Out2) that is defined by the effective filter function 644 centered at a reflection wavelength $\lambda_{c2}$, which corresponds to the reflection wavelengths $\lambda_{a2}, \lambda_{b2}$ of the filter functions 631, 631'. As described hereinabove, the effective filter function 646 is the product of the aligned filter functions 631, 631'.

Figure 19:
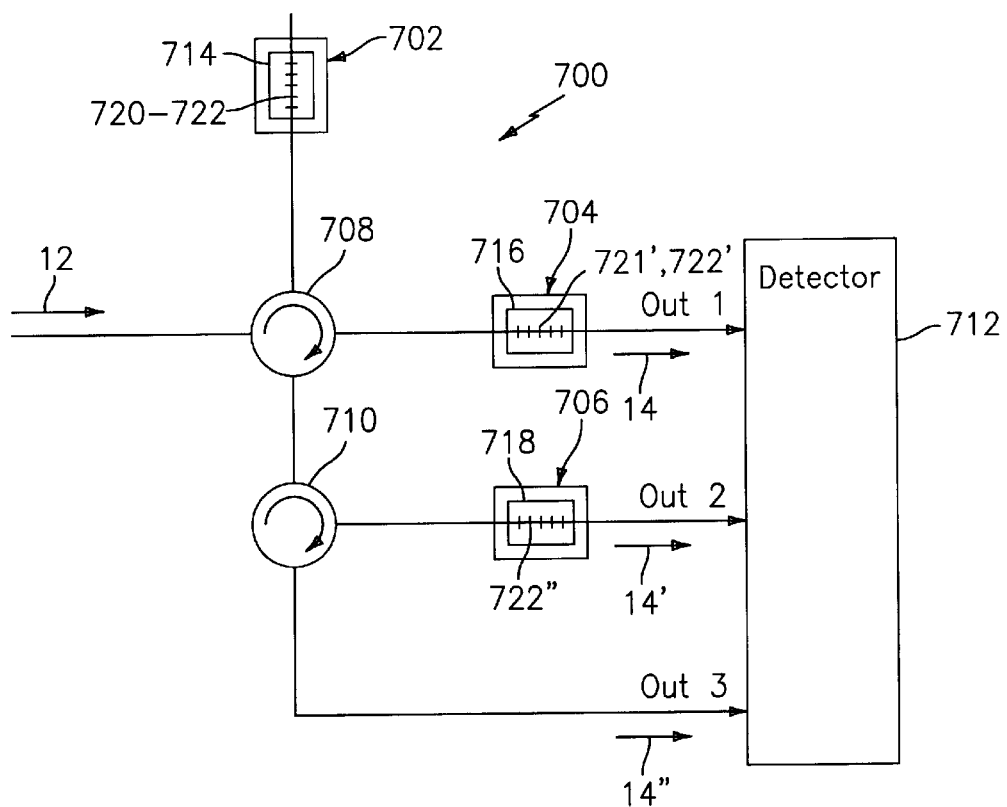
FIG. 19 is a block diagram of another embodiment of a tunable optical filter in accordance with the present invention.

FIG. 19 is illustrative of another embodiment of a tunable optical filter 700 similar to that shown in FIG. 18, except that the optical filter 700 provides three output ports (Out1, Out2, Out3) which provide wavelength bands over three independent spectral ranges.

The optical filter 700 includes three tunable Bragg grating units 702, 704, 706, optically coupled to respective ports of a pair of optical directing device 708, 710, such as 4-port circulators. An optical wavelength detector 712 may be connected to output ports of the filter 700 for detecting and analyzing specific parameters (i.e., signal-to-noise ratio, power frequency, power density, etc.) of the selected wavelength bands of light 14, 14', 14".

Each grating unit 702, 704, 706 tunes a respective grating element 714, 716, 718, wherein grating element 714 includes three Bragg gratings 720–722, grating element 716 includes Bragg gratings 721'–722', and grating element 18 includes Bragg gratings 722".

The operation of the optical filter 700 is similar to that of the optical filter 600 in that grating element 716 is tuned to align the reflection wavelengths of gratings 721'–722' with the reflection wavelengths of the complementary gratings 721, 722 of grating element 714. As a result, the wavelength bands centered at wavelengths $\lambda_{b1}, \lambda_{b2}$ are reflected to grating element 718, and wavelength band centered at $\lambda_{a1}$ is transmitted to the first output (Out 1). Further, the grating element 718 is tuned to align the reflection wavelength of grating 722" with reflection wavelength of the complementary grating 722' of grating element 716. As a result, the wavelength band centered $\lambda_{b2}$ is transmitted to the second output port (Out2), and the wavelength band centered at wavelength $\lambda_{b2}$ is reflected to the third output port (Out3).

Figures 20A, 20B, 20C:
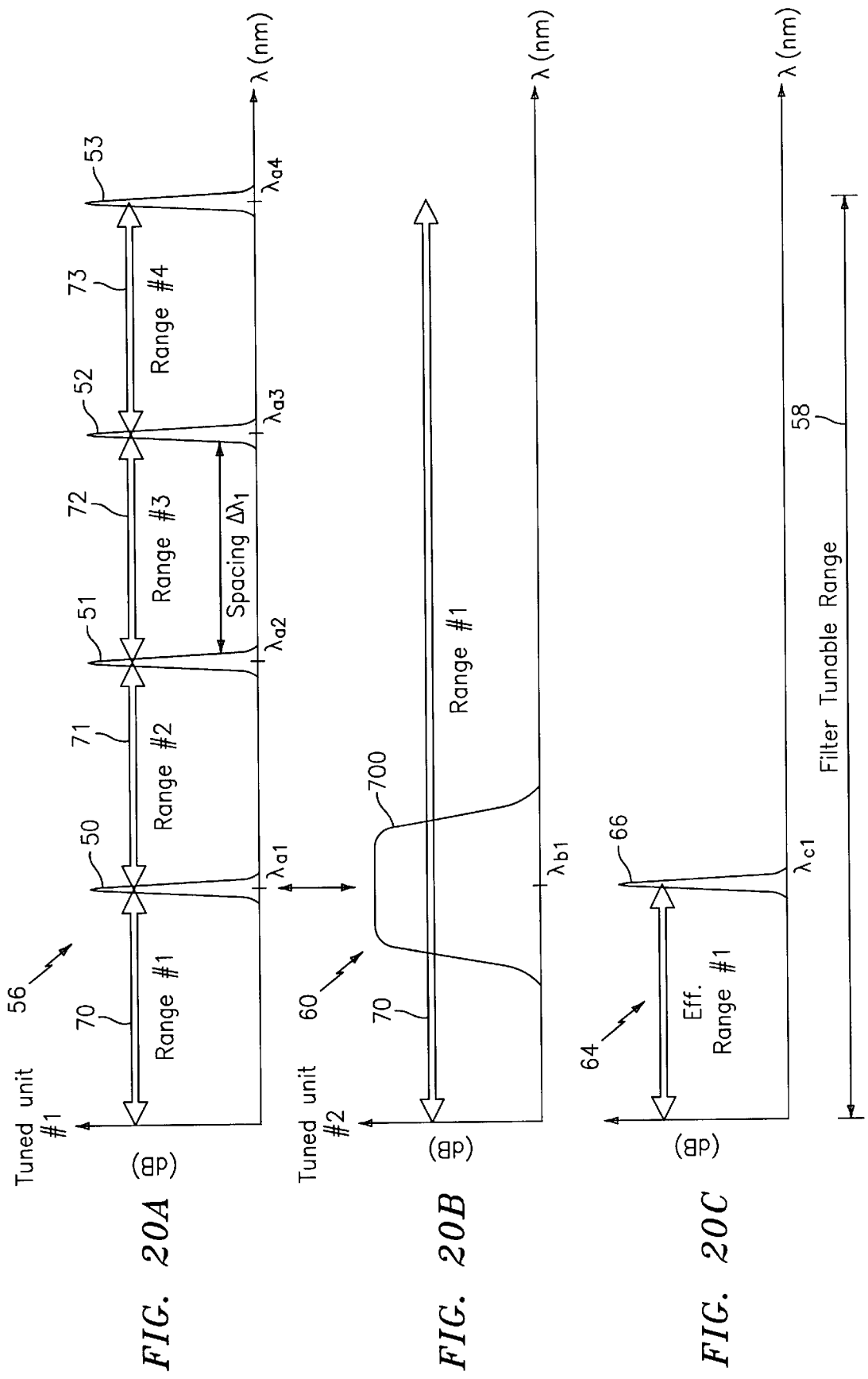
FIGS. 20A–20C are graphical representations of the effective filter function of an alternative embodiment of the tunable optical filter of FIG. 1, and the filter functions of the grating elements of the alternative embodiment of the tunable optical filter of FIG. 1.

While the tunable grating element 42 of FIG. 1 includes an array of gratings 44'–47', one will appreciate that grating element 42 may include a number of gratings less than the number of gratings written in grating 16, provided the gratings of grating element 42 are tunable over a wider spectral range. For example as shown in FIGS. 20A–C, the grating element 42 may have a single grating that is tunable over the full tunable range of the optical filter 10. In the following description of the alternative embodiment of optical filter 10, components and features common to the previously described embodiments have the same reference numbers, and therefore are not described in detail.

As shown in FIG. 20B, the single grating of grating element 42 has a filter function 700 centered at $\lambda_{b1}$, which has a bandwidth greater that the bandwidth of filter functions 50–53 of gratings 44–47, and has a length shorter than the gratings 44–47 because of buckling concerns as described hereinbefore. For example, the single grating of grating element 42 may be approximately 3 mm. As a result of the shorter grating, the bandwidth of the filter function 700 of the grating of grating element 42 is much wider than filter functions 50–53 of gratings 44–47. The wider filter function 700 is permissible providing the width of the filter function 700 is less than the spacing between filter functions 50–53

While each grating unit 16, 18 has been described hereinabove as being tunable, one will recognize that one of the grating units 16, 18 may be fixed, while the other grating unit is tunable. Consequently, the tunable grating unit functions as a means to select which of the wavelength bands filtered by the fixed grating.

Figure 21:
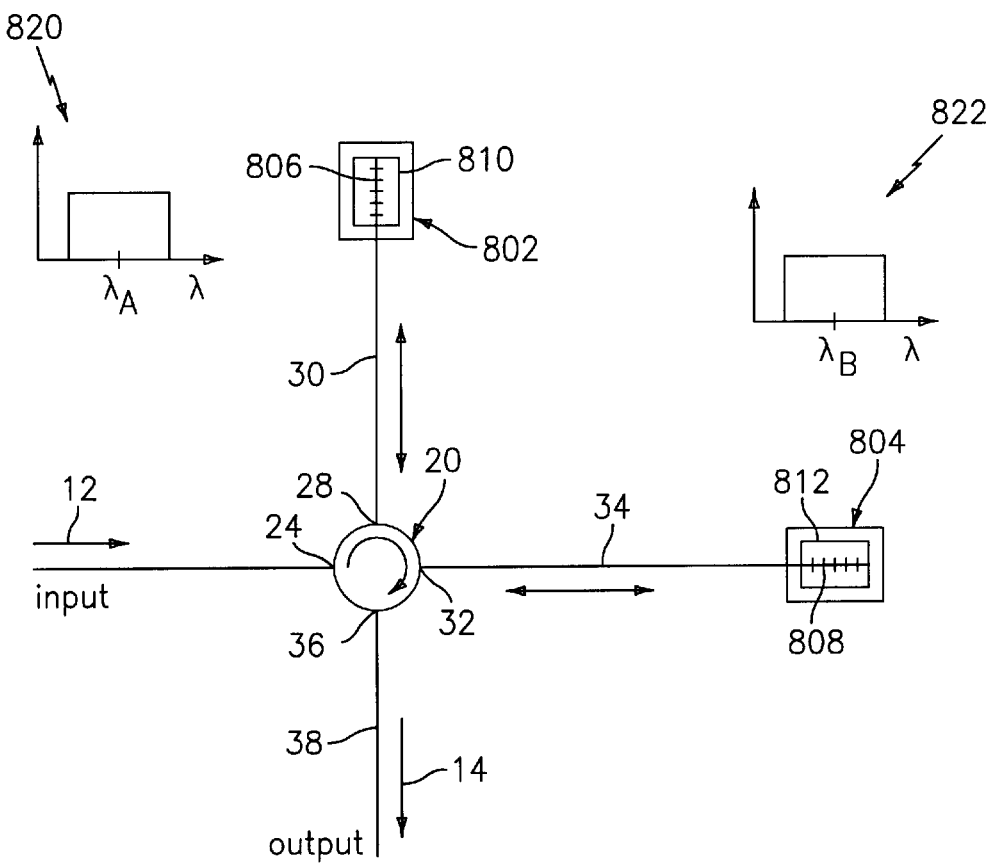
FIG. 21 is a block diagram of a tunable broadband optical filter having a pair of grating elements in accordance with the present invention.

FIG. 21 illustrates a broadband optical filter 800 having near zero chromatic dispersion characteristics. Similar to the optical filter 10 shown in FIG. 1, the optical filter 800 includes a pair of tunable Bragg grating units 802, 804 optically coupled to a circulator 20. The tunable Bragg grating units 802, 804 are substantially the same as the tunable Bragg grating units 16, 18 of FIG. 1, except each tunable Bragg grating unit 802, 804 has a chirped grating 806, 808 written into the cores of the respective grating elements 810, 812. The components of FIG. 21 that are similar to those of FIG. 1 have the same reference numeral.

A chirped grating has a non-uniform period along its length, and may have different forms of a non-uniform period. For example, the period of a chirped grating may vary linearly with the length of the grating to form a linear grating. Also, the period of the grating may be quadratic, random or may even have jumps in the period. Further, the period may vary symmetrically, either increasing or decreasing in period around a pitch in the middle of the grating.

Generally, the grating unit 802 reflects a selected wavelength band to grating unit 804, which reflects a portion of the reflected wavelength band to an output 38 of the optical filter 800. This double reflection technique provides an optical filter 800 having an effective filter function that is equal to the product of the individual filter functions 820, 822 of the respective grating units 802, 804, as illustrated in FIG. 21.

The filter function 820 of one of the gratings 802 comprises a relatively broad wavelength band having a generally rectangular profile, centered about reflection wavelength $\lambda_A$. The filter function 822 of the other grating 802 comprises a relatively broad wavelength band having a generally rectangular profile, centered about reflection wavelength $\lambda_B$, which is substantially the same as wavelength $\lambda_A$.

Specifically, a first port 24 of the circulator 20 receives the DWDM light 12 transmitted through optical fiber 26. The light 12 may originate from a light source or tapped off an optical network (not shown). The circulator 20 directs the input light 12 in a clockwise direction to the second port 28 of the circulator. The input light 12 exits the second port 28 and propagates through optical fiber 30 to the grating 806 of grating unit 802. The grating 802 is tuned to a selected reflection wavelength $\lambda_A$ to reflect the desired wavelength band of the input light back to the second port 28 of the circulator 20, and passes the remaining wavelengths of the input light through the grating unit 802.

The circulator 20 then directs the reflected wavelength band of the light to a third port 32 of the circulator 20. The reflected wavelength band of the light exits the third port 32 and propagates through optical fiber 34 to the grating 808 of grating unit 804. The grating 808 is tuned to a reflection wavelength $\lambda_B$, which is substantially aligned with wavelength $\lambda_A$. Therefore, the gratings 806, 808 of the tunable optical filter 800 are centered at substantially the same reflection wavelengths $\lambda_A, \lambda_B$. The wavelength band reflected from grating unit 804 reflects back to the third port 32 of the circulator 20, which directs the double reflected wavelength band through a fourth port 36 of the circulator 20 to the output of the optical filter 800 through optical fiber 38.

The Bragg gratings 806, 808 are chirped to provide a strong broadband optical filter 800. One potential drawback with the use of Bragg gratings in optical networks, however, is the chromatic dispersion characteristics associated with chirped gratings. This chirp characteristic will lead to a wavelength dependent delay in the filter and therefore an optical dispersion, which can cause signal degradation in an optical network, particularly when high data rates are used. To compensate or correct for the chromatic dispersion, the two broadband chirped gratings 806, 808 which are identically chirped, are oriented or written in a opposite directions, as shown in FIGS. 22(a) and 22(b).

Figures 22A, 22B:
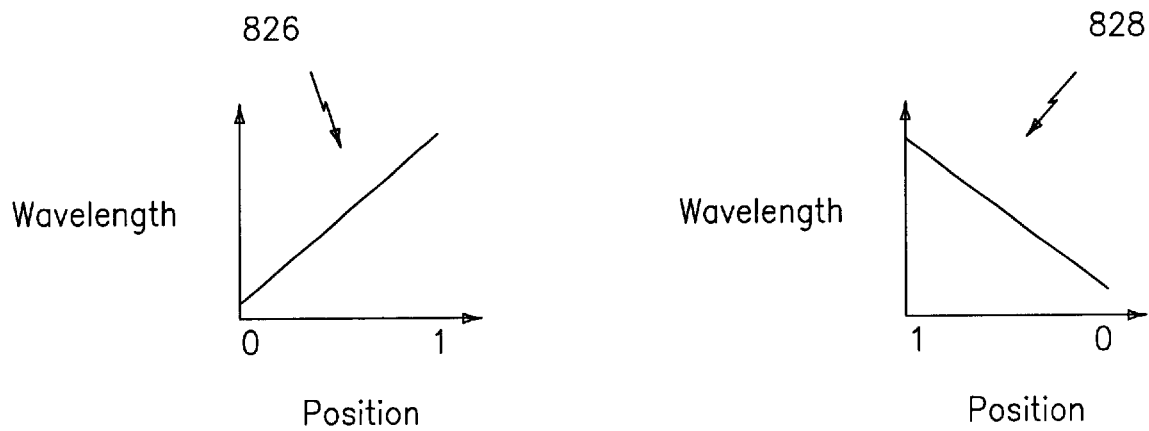
FIGS. 22A and 22B are graphical representations of the chirped characteristics of the gratings of the grating elements of FIG. 21.

FIG. 22(a) illustrates the chirped characteristics 826 of grating 806 of grating unit 802 wherein the reflection wavelength (or period) of the grating increases linearly along its length. The light reflected by grating 806, therefore, is dispersed linearly in the positive direction. FIG. 22(b) illustrates the chirped characteristics 828 of grating 808 of grating unit 804, wherein the reflection wavelength (or period) of the grating decreases linearly along its length. The light reflected by grating 808, therefore, is dispersed linearly in the negative direction.

Consequently, the broadband light reflected by grating 806 is first dispersed linearly in the positive direction, and then reflected again by grating 808, which has a negative dispersion characteristic equal in magnitude as positive dispersion of associated with grating 806. The resulting broadband output light has substantially no dispersion or near zero dispersion. This filter 800 may find use as a cleanup filter where only certain portion of the wavelength band is desired.

Another benefit of reflecting the filtered light twice is to provide a sharp overall filter function with a relatively short Bragg grating as described hereinbefore, and in U.S. patent application Ser. No. 09/648,525, entitled "Optical Filter Having A Shaped Filter Function".

Figure 23:
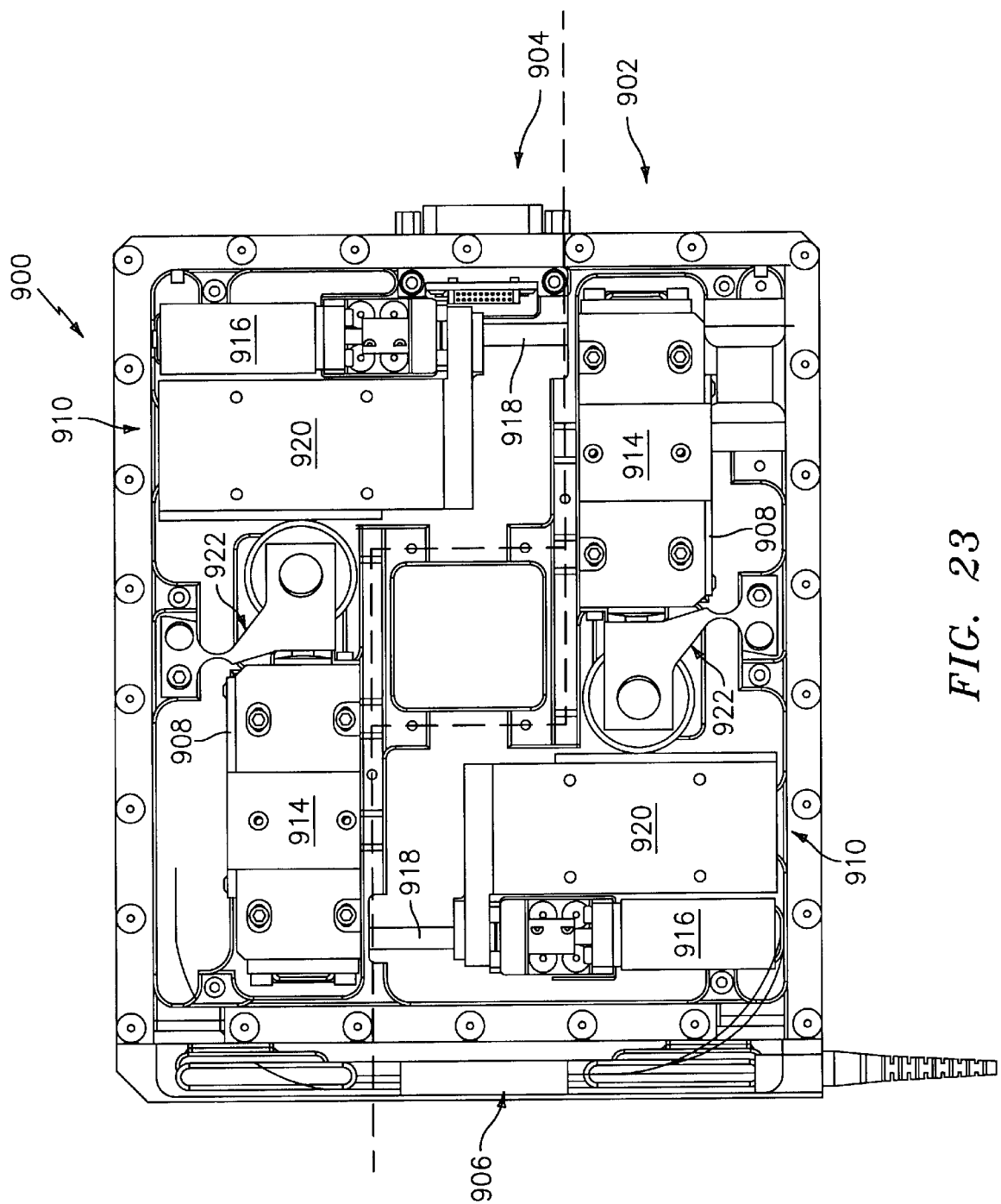
FIG. 23 is a top plan view of a tunable optical bandpass filter having a pair of grating elements in accordance with the present invention.

FIG. 23 is illustrative of a tunable optical bandpass filter 900 having a pair of tunable optical grating units 902, 904 optically coupled by a pair of 3-port circulators 906 similar to the topography shown in FIG. 12. Both grating units 902, 904 are disposed in a hermetically sealed housing, which also includes the circulators, the controller (not shown) and the displacement sensor circuit 908 similar to that shown in FIG. 8.

Each grating unit 902, 904 includes an actuator mechanism 910 that, in response to a drive signal provided by the controller, compresses an optical waveguide 912 (see FIGS. 27 and 28) disposed within a tunable grating module 914. The actuator mechanism 910 includes a stepper motor 916 and leadscrew 918 for translating a linear slide 920, which displaces linearly a flexure arm 922 to compress or tune the optical waveguide 912 of the grating module 914. The actuator mechanism 910 is similar to that described in U.S. patent application Ser. No. 09/752,332 (CC-0322), entitled "Actuator Mechanism for Tuning An Optical Device", which is incorporated herein by reference in its entirety.

Figure 24:
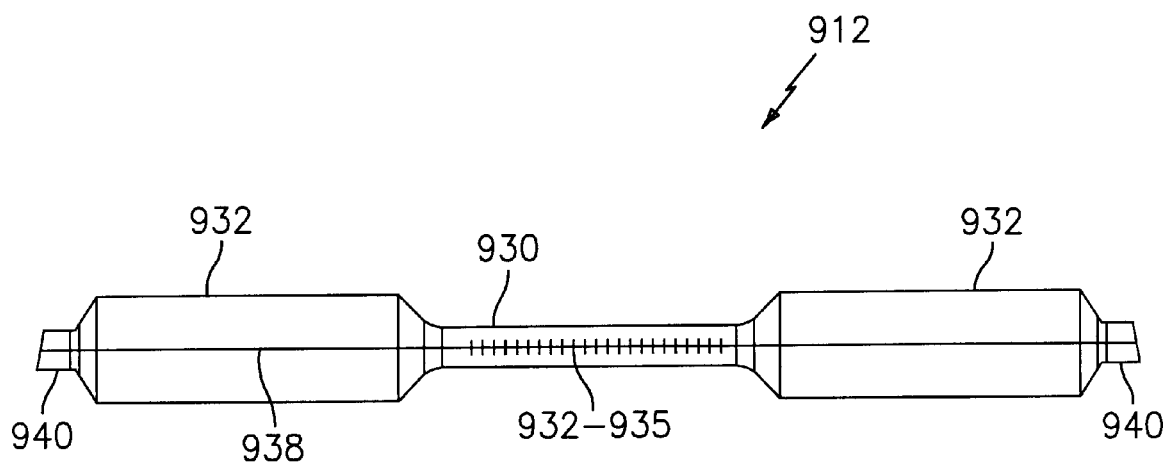
FIG. 24 is a side elevational view of the grating elements of the bandpass filter of FIG. 23.

Referring to FIG. 24, each grating module 914 includes a large diameter optical waveguide 912 (e.g., cane and collapsed tube) that is grounded to provide a generally "dog-bone" shape, as described hereinbefore. The waveguide includes a midsection 930 disposed between a pair of axial ends 932. A plurality of co-located Bragg gratings 932–935 are disposed in the core 938 of the midsection 930 of the optical waveguide 912, as described hereinbefore. In one embodiment, the waveguide 912 has an overall length of 26.5 mm, wherein the length of the midsection 930 is 9.2 mm and the length of the axial ends 932 are 7.0 mm each. The axial ends taper to the midsection at approximately 45 degrees. A nub 940 extends axially from each axial end 932, whereby an optical pigtail assembly 942 is coupled to one of the nubs (see FIG. 25). The axial ends 932 taper to the nubs 940 at approximately 60 degrees. The outer diameter of the axial ends of the waveguide 912 are approximately 2.5 mm, and the outer diameters of the midsection 930 are approximately 0.9 mm and nubs 940 are approximately 0.8 mm. The ends of the nubs are cut and polished at an angle of approximately 9 degrees.

Figure 25:
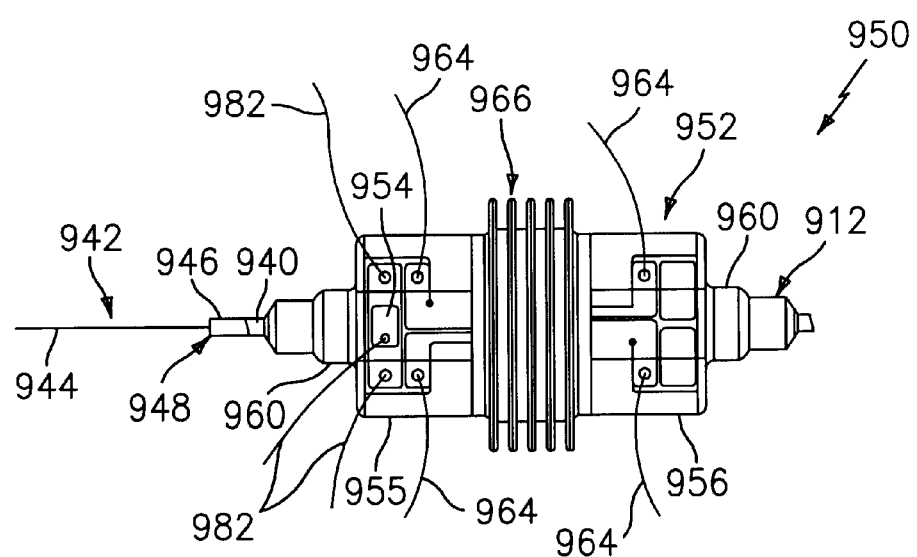
FIG. 25 is a side elevational view of a waveguide assembly of the bandpass filter of FIG. 23.

Referring to FIG. 25, the pigtail assembly 942 comprises a length of optical fiber 944 (i.e., SMF28) having a glass tube 946 epoxied to one end of the fiber to form the coupling end 948. The outer diameter of the tube 946 is approximately equal to the outer diameter of the nub 940 and the inner diameter is slightly greater than the outer diameter of the fiber 944 to permit epoxying of the fiber within the tube. The coupling ends 948 of the pigtail assembly 942 are cut and polished at a complementary angle (i.e., 9 degrees) to the nubs 940. The coupling end 948 of the pigtail tail assembly is attached, such as by epoxy or fusion, to the angled ends of nubs of the optical waveguide 912. The complementary angled surface of the pigtail and waveguide help to reduce light reflecting back along the core 938 as a consequence of the waveguide/pigtail assembly interface.

Figure 26:
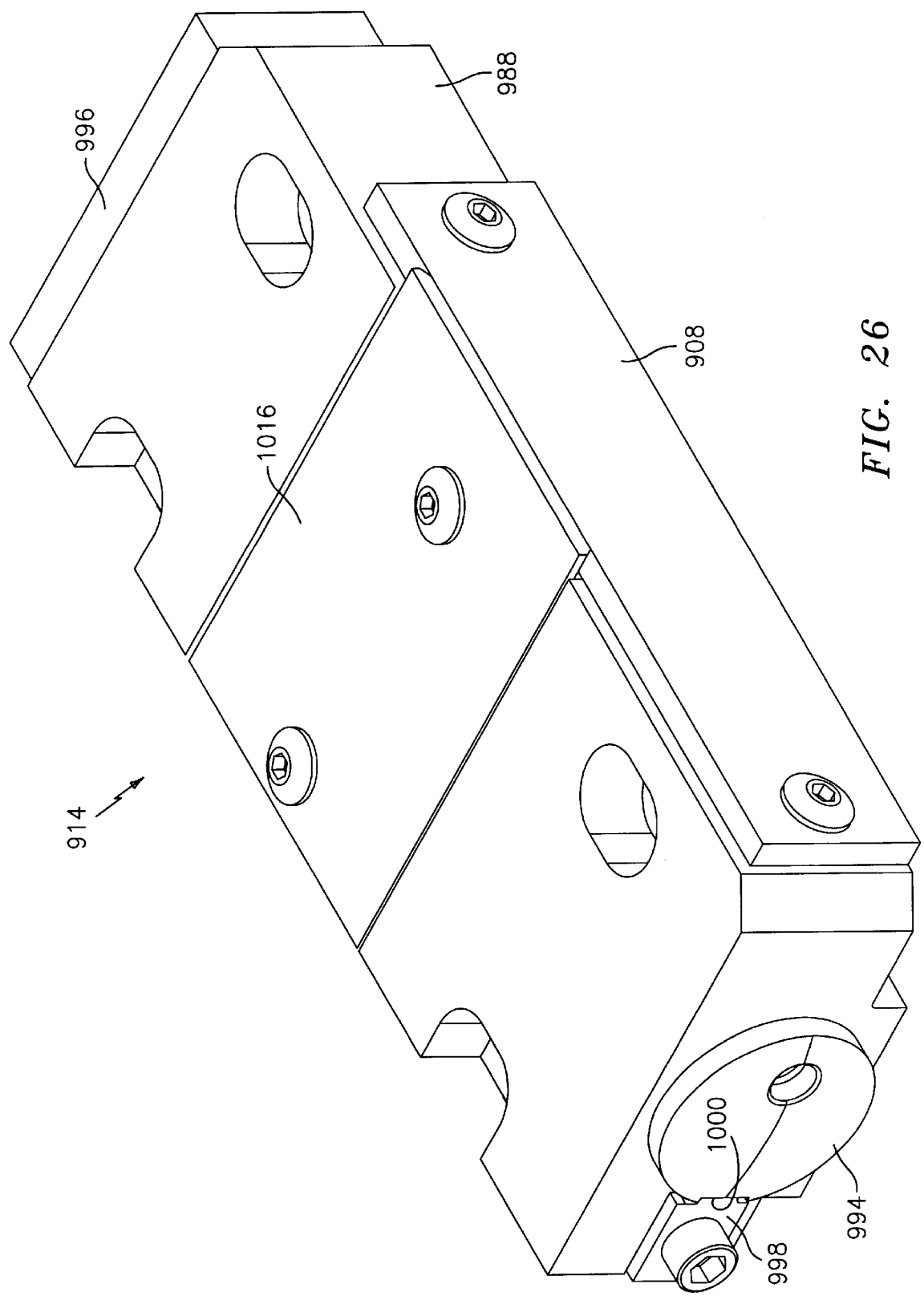
FIG. 26 is a perspective view of a Bragg grating module of the bandpass filter of FIG. 23.
Figure 27:
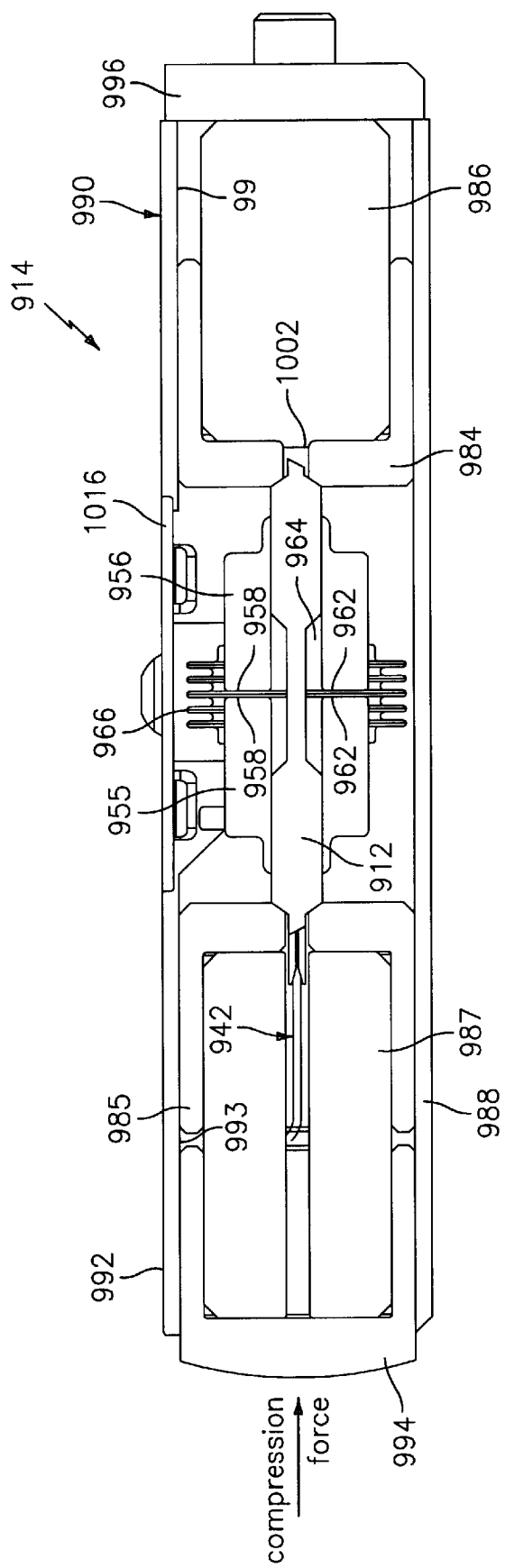
FIG. 27 is a side cross-sectional view of the Bragg grating module of FIG. 26.

FIGS. 25 and 27 show a waveguide assembly 950 comprising an optical waveguide 912, a pigtail 942 attached to a nub 940 of the waveguide, a displacement sensor 952 and a temperature sensor 954. Similar to the displacement sensor 134 of FIG. 8 described hereinbefore, the displacement sensor 952 includes a pair of capacitive elements 955, 956 and a displacement circuit 908 (see FIGS. 26 and 28). Each capacitive element 955, 956 is generally tubular and provide a capacitive surface 958. The capacitive elements are mounted to respective axial ends 932 of the grating element 912 at 960 such that the capacitive surfaces 958 are spaced a predetermined distance apart, for example, approximately 1–2 microns. Other spacings may be used if desired. The capacitive elements 955, 956 may be bonded or secured using an epoxy or other adhesive compound, or fused to waveguide element 912 using a $CO_2$ laser or other heating element. The capacitive surfaces 958 are coated with a metallic coating, such as gold, to form a pair of annular capacitive plates 962. The change in capacitance depends on the change in the spacing between the capacitive plates.

Electrodes 964 are attached to the capacitive plates 962 to connect the capacitor to the displacement sensor circuit 908. The sensor circuit 908 measures the capacitance between the capacitive plates 962; and provides a sensed signal, indicative of the measured capacitance, to the displacement controller. As the waveguide 912 is strained, the gap between the parallel capacitive plates 962 will vary, thereby causing the capacitance to change correspondingly, as described in greater detail hereinbefore.

Figure 28:
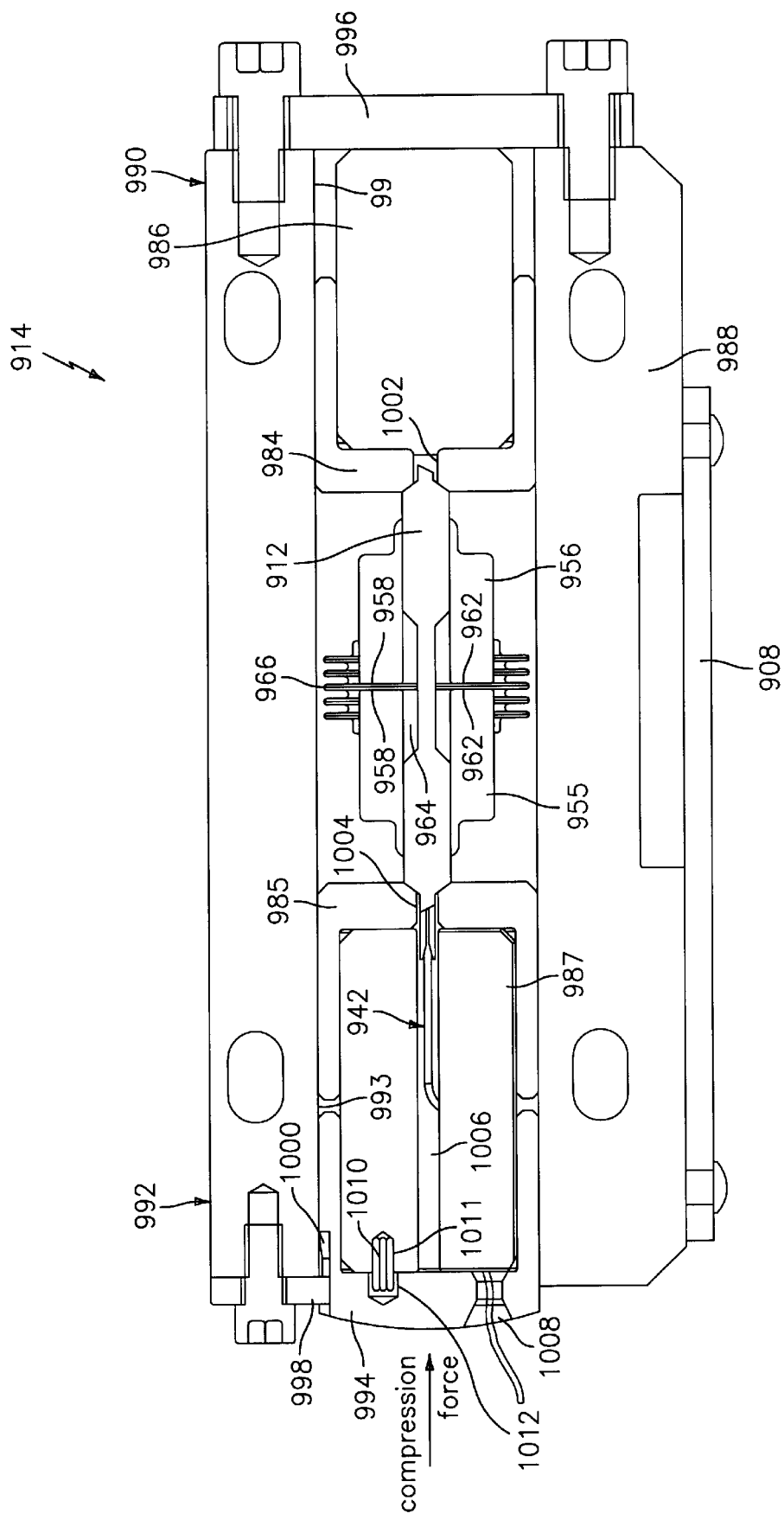
FIG. 28 is a top cross-sectional view of the Bragg grating module of FIG. 26.

Referring to FIGS. 27 and 28, the cavity 964 about the intermediate portion 930 of the waveguide 912 and the capacitive plates 962 is hermetically sealed by sealing a bellows 966 over the gap between the capacitive elements 955, 956. The bellows prevents airborne contaminants, particulates and moisture from depositing or forming on the capacitive plates 962, which may affect the capacitance therebetween. The ends of the bellows are sealed to the capacitive elements by an epoxy. The bellows 966 is formed of a metal or metal alloy, having substantially thin walls (e.g., 0.0005 inches) to permit the extension and retraction of the bellows to reduce mechanical stresses in the waveguide assembly 950.

Alternatively, a silicon tube or bellows, or metallized film (e.g., Mylar®) may be to seal the cavity 96 from the migration of water molecules and airborne contaminants. The silicon tube or metallized film is sufficiently pliable to avoid any additional force required to be overcome by the drive mechanism, and avoid any change in alignment of the capacitive elements 955, 956. The length of the tube is slightly longer than the length of the capacitive elements such that the tube forms a slight bellows or bow when attached to the capacitive elements. When the capacitive elements are placed under tension for pre-load, the diameter of the bellows or bow is larger, ensuring that there is no interference with the motion of the capacitive elements.

Specifically, the tube may be formed of a film of metallized plastic (e.g., Mylar®). The film has a strip of adhesive along the long sides to adhere circumferencially to the capacitive elements 955, 956, and an adhesive strip along one of the short sides for attachment to the top surface of the film.

As shown in FIG. 25, a temperature sensor 954, such as a thermister or thermocouple is mounted to a capacitive element 955 for sensing the temperature of the waveguide assembly 950. The temperature signal is provide to the displacement sensor circuit via electrodes 982. The capacitance of the displacement sensor 952 is dependent on temperature, and therefore, the controller, in response to the temperature of the capacitive elements 955, 956, compensates for the shift in the capacitive reading of the displacement sensor 952.

Referring to FIGS. 26–28, the Bragg grating module 914 includes the waveguide assembly 950, a pair of seats 984, 985, and a pair of expansion plungers 986, 987 disposed within a housing assembly 988 formed of a high strength metal or metal alloy material. The housing includes a fixed end 990 having a bore 991 for receiving expansion plunger 986 and seat 984, and a drive end 992 having a bore 993, axially aligned with bore 991, for receiving a piston 994, expansion plunger 987, and seat 985. A fixed end plate 996 is attached to the fixed end 990 of the housing 988, such as by fasteners, and the piston is slidably retained within the drive end of the housing by a key or retaining plate 998, which is disposed within a slot 1000 in the outer surface of the piston. The seats 984, 985, piston 994 and fixed end plate 996 secure and maintain in axial alignment the plungers 986, 987 and optical waveguide assembly 950.

The fixed seat 984 is generally "cup-shaped" having an inner cylindrical cavity disposed therein for receiving the fixed expansion plunger 986. The outer diameter of the fixed seat 984 is approximately equal to the inner diameter of the fixed bore. The fixed seat has an axial hole 1002 for receiving the nub 940 of the waveguide 912. The outer portion of the axial hole 1002 in the fixed seat 984 has an axial counter bore, which is frusto-conical in shape, to provide a seat for receiving and locating an axial end 932 of the optical waveguide 912. The frusto-conical counter bore in the fixed seat helps to align the waveguide to thereby reduce the possibility of damage to the waveguide (i.e., cracking, buckling).

The fixed plunger 986 is disposed between the fixed seat 984 and the end plate 996. One end of the fixed plunger 986 is received within the cavity of the fixed seat 984 and the other end of the fixed plunger abuts the end plate 996. The outer diameter of the expansion plunger is substantially the same as the inner diameter of the fixed seat.

The drive seat 985, which is substantially the same as the fixed seat 984, is generally "cup-shaped" having an inner cylindrical cavity disposed therein for receiving the drive plunger 987. The outer diameter of the drive seat 985 is approximately equal to the inner diameter of the drive bore. The drive seat has an axial hole 1004 for receiving the nub 940 of the optical waveguide 912 and the pigtail 942 attached thereto. The outer portion of the axial hole 1004 in the drive seat 985 has an axial counter bore, which is frusto-conical in shape, to provide a seat for receiving and locating the other axial end 932 of the optical waveguide. The frusto-conical counter bore in the drive seat helps to align the waveguide to thereby reduce the possibility of damage to the waveguide (i.e., cracking, buckling).

The drive plunger 987 is disposed between the drive seat 985 and the piston 984. One end of the drive plunger is received within the cavity of the drive seat 985 and the other end of the drive plunger is received within the cavity of the piston 994. The outer diameter of the drive plunger 987 is substantially the same as the inner diameters of the drive seat 985 and the piston 994. The drive plunger 987 has a slot 1006 that extends radially outward from the axis of the drive plunger for receiving and guiding the pigtail 942 to the through hole 1008 disposed in the piston 994. The width of the slot 1006 is greater than the width of the optical fiber 944 of the pigtail 942 to permit unrestricted movement of the pigtail in the drive plunger. A roll pin 1010 is secured within a hole 1011 disposed in the drive plunger 987, which is axially aligned with a hole 1012 disposed in the inner portion of the piston 994. The roll pin 1010 functions to maintain the drive plunger in fixed relations with the piston, and thereby, prevent rotation of the drive plunger relative to the piston, which may result in damage to the pigtail 942 and optical waveguide 912. The depth of the cavities of both the drive seat 985 and the piston 994 is substantial to maintain the drive seat, piston and drive plunger in axial alignment, but sufficiently shallow to provide a spacing between the drive seat and the piston during the operation of the optical filter module 914, and thermal expansion of the components.

The fixed and drive plungers are formed of a metal or metal alloy, such as steel, stainless steel, aluminum, high expansion alloy, for example High Expansion "19-2"®, High Expansion "22-3"®, High Expansion "72"®, (registered trademark of Carpenter Technology Corporation) containing various levels of carbon, manganese, silicon, chromium, nickel, iron, and copper, or other material having a higher coefficient of thermal expansion (CTE) than the housing assembly. The CTEs and lengths of the optical waveguide, the piston, the seats and expansion plungers are selected such that the reflection wavelength of the grating does not substantially change over a predetermined temperature range (i.e., 100° C.). More specifically, the length of the plungers 986, 987 are sized to offset the upward grating wavelength shift due to temperature and the thermal expansion of the housing, waveguide, seats and piston. As the temperature increases, the plungers' lengths expand faster than the optical waveguide, which shifts the grating wavelength down to balance the intrinsic wavelength shift up with increasing temperature, similar to the thermal compensation described in U.S. patent application Ser. No. 09/699, 940 (CC-0234A), entitled "Temperature Compensated Optical Device", which is incorporated herein by reference in its entirety.

The housing 988 further includes a removable cover 1016 to permit access to the optical waveguide assembly 950 disposed therein.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. A tunable optical filter device comprising:
    a first optical filter including a plurality of first reflective elements, each of the first reflective elements having a respective first reflective filter function centered at respective reflection wavelengths for reflecting a respective first wavelength band of light, each of the first reflective filter functions being spaced and substantially non-overlapping; and
    a second optical filter, optically connected to the first optical filter to receive the first wavelength bands of light, including a plurality of second reflective elements, each of the second reflective elements having a respective second reflective filter function centered at respective reflection wavelengths for reflecting a respective second wavelength band of light, each of the second reflective filter functions being spaced and substantially non-overlapping;
    one of the first and second optical filters being tunable to overlap at least one of the first reflective filter functions and one of the second reflective filter functions.

2. The optical filter device of claim 1, wherein both the first and second optical filters are tunable to overlap at least one of the first reflective filter functions and one of the second reflective filter functions.

3. The optical filter device of claim 1, wherein one of the first and second optical filters is tunable to overlap only one of the first reflective filter functions and one of the second reflective filter functions.

4. The optical filter device of claim 1, wherein the first reflective filter functions and the second reflective filter functions are spaced respectively to ensure only one pair of first and second reflection filter functions overlap when any pair of complementary first and second reflective filter functions overlap.

5. The optical filter device of claim 1, wherein one of the first reflective filter functions and one of the second reflective filter functions are overlap in a normal mode of operation.

6. The optical filter device of claim 1, wherein one of the first and second optical filters is tunable such that none of the first reflective filter functions and second reflective filter functions overlap.

7. The optical filter device of claim 4, wherein the spacings between the reflective wavelengths of the first reflective filter functions are substantially equal.

8. The optical filter device of claim 7, wherein the spacings between the reflective wavelengths of the second reflective filter functions are substantially equal.

9. The optical filter device of claim 8, wherein the spacings between the first reflective filter functions are less than the spacings between the second reflective filter functions by a predetermined offset.

10. The optical filter device of claim 1, further comprising:
    an optical directing device optically connected to the first and second optical filters; the optical directing device providing the light to the first optical filter, providing the first wavelength bands of light reflected from the first reflective elements to the second optical filter, and directing the light reflected from the second reflective elements to an output port.

11. The optical filter device of claim 10, wherein the optical directing device comprises one of at least one circulator and an optical coupler.

12. The optical filter device of claim 1, wherein one of the first and second optical filters is tunable to substantially align one of the first reflection wavelengths and one of the second reflection wavelengths.

13. The optical filter device of claim 1, wherein one of the first and second reflective filter functions is Gaussian.

14. The optical filter device of claim 1, wherein one of the first reflective filter function is different than the second reflective filter function of acomplementary second reflective element.

15. The optical filter device of claim 14, wherein the one of the first reflective elements is fully apodized and the one of the second reflective elements is partially apodized.

16. The optical filter device of claim 1, wherein one of the first and second optical filters being tunable to offset one of the first reflection wavelengths and one of the second reflection wavelengths to reflect a portion of the partially aligned wavelength bands.

17. The optical filter device of claim 1, wherein at least one of the first and second optical filters comprises an optical waveguide, wherein the reflective elements of the at least one of the respective first and second optical filters comprise respective gratings disposed in the core in a longitudinal direction.

18. The optical filter device of claim 17, wherein the gratings of one of the first and second optical filters are written over each other in the inner core to form a multicomponent grating.

19. The optical filter device of claim 17, wherein the gratings of one of the first and second optical filters are written in series in the inner core in a concatenated manner.

20. The optical filter device of claim 1, wherein the one of the first and second optical filters comprises:
    an optical fiber, having the respective first or second reflective elements written therein; and
    a tube, having the optical fiber and the respective first or second reflective elements encased therein along a longitudinal axis of the tube, the tube being fused to at least a portion of the fiber.

21. The optical filter device of claim 1, wherein at least one of the first and second optical filters comprises an optical waveguide having an outer cladding and an inner core disposed therein, the outer cladding having an outer transverse dimension of at least 0.3 mm.

22. The optical filter device of claim 2 further includes a tuning device for compressing simultaneously and axially the first and second optical filters, wherein each of the first and second reflective elements are disposed along an axial direction of each respective first and second tunable optical filter.

23. The optical filter device of claim 2 further comprising:
a first tuning device for compressing axially the first optical filter to tune the first reflective elements, wherein the first reflective elements are gratings written in the longitudinal direction in the first tunable optical filter; and
a second tuning device for compressing axially the second optical filter to tune the second reflective elements, wherein the second reflective elements are gratings written in the longitudinal direction in the second tunable optical filter.

24. The optical filter device of claim 1 further includes a straining device for tensioning axially the one of the first and second optical filters to tune the first or second reflective elements, wherein the respective first or second reflective elements are gratings disposed along an axial direction of the respective first or second optical filter.

25. The optical filter device of claim 1 further includes a heating device for varying the temperature of the one of the first and second optical filters to tune the respective first or second reflective elements, wherein the respective first or second reflective elements are gratings disposed along an axial direction of the respective first or second optical filter.

26. The optical filter device of claim 1 further includes:
a first tuning device for axially compressing at least the first optical filter to tune the first reflective elements, responsive to a displacement signal, wherein the first reflective elements are disposed axially along the first tunable optical filter; and
a displacement sensor, responsive to the compression of the first optical filter, for providing the displacement signal indicative of the change in the axial displacement of the first optical filter.

27. The optical filter device of claim 26, wherein the displacement sensor includes a pair of spaced, capacitive plates coupled to the first optical filter, wherein the capacitance between the plates correlates to the axial displacement of the first optical filter.

28. The optical filter device of claim 2, wherein the first and second optical filters are simultaneously tuned to overlap one of the first reflection filter functions and one of the second reflection filter functions to reflect a wavelength band of light within a desired spectral range.

29. The optical filter device of claim 2, wherein the first and second optical filters are simultaneously tuned to overlap each of the first reflection filter functions and each complimentary second reflection filter function to reflect sequentially a wavelength band of light over each respective spectral range.

30. A method for selectively filtering an optical wavelength band from an input light; the method comprising:
providing a first optical filter including a plurality of first reflective elements, each of the first reflective elements having a respective first reflective filter function centered at respective reflection wavelengths for reflecting a respective first wavelength band of light, each of the first reflective filter functions being spaced and substantially non-overlapping;
directing the input light to the first optical filter;
providing a second optical filter including a plurality of second reflective elements, each of the second reflective elements having a respective second reflective filter function centered at respective reflection wavelengths for reflecting a respective second wavelength band of light, each of the second reflective filter functions being spaced and substantially non-overlapping;
directing the plurality of the reflected first wavelength bands to the second optical filter; and
tuning one of the first and second optical filters to overlap at least one of the first reflective filter functions and one of the second reflective filter functions.

31. The method of claim 30, wherein tuning one of the first and second optical filters further comprises:
tuning both the first and second optical filters to overlap at least one of the first reflective filter functions and one of the second reflective filter functions.

32. The method of claim 30, wherein the first reflective filter functions and the second reflective filter functions are spaced respectively to ensure only one pair of first and second reflection wavelengths overlap when any pair of complementary first and second reflective filter functions overlap.

33. The method of claim 31, further comprising:
tuning simultaneously over a first spectral range the first and second optical filters to maintain the overlap of the selected first reflective filter function and the complementary second reflective filter function.

34. The method of claim 33, further comprising:
tuning one of the first and second optical filters to overlap another one of the first reflective filter functions and another one of the second reflective filter functions to reflect the overlapping portion of the corresponding first and second wavelength bands; and
tuning simultaneously over a second spectral range the first and second optical filter to maintain the overlap of the other selected first reflective filter function and the other complementary second reflective filter function.

35. The method of claim 30, wherein one of the first reflective filter functions and one of the second reflective filter functions overlap in a normal mode of operation.

36. The method of claim 30, wherein one of the first and second optical filters is tunable such that none of the first reflective filter functions and second reflective filter functions overlap.

37. The method of claim 32, wherein the spacings between the reflective wavelengths of the first reflective filter functions are substantially equal.

38. The method of claim 37, wherein the spacings between the reflective wavelengths of the second reflective filter functions are substantially equal.

39. The method of claim 38, wherein the spacings between the first reflective filter functions are less than the spacings between the second reflective filter functions by a predetermined offset.

40. The method of claim 30, wherein tuning one of the first and second optical filters further comprises:
tuning one of the first and second optical filters to substantially align one of the first reflection wavelengths and one of the second reflection wavelengths.

41. The method of claim 30, wherein tuning one of the first and second optical filters further comprises:
tuning the first and second optical filters to offset one of first reflection wavelengths and one of the second reflection wavelengths to reflect an overlapping portion of the respective aligned wavelength bands.

42. The method of claim 30, wherein tuning the first and second optical filters further comprises:
tuning simultaneously the first and second optical filters to overlap one of the first reflection filter functions and one of the second reflection filter functions to reflect a wavelength band of light within a desired spectral range.

43. The method of claim 30, wherein the first and second optical filters further comprises tuning simultaneously the first and second optical filters to overlap each of the first reflection filter functions and each complimentary second reflection filter function to reflect sequentially a wavelength band of light over each respective spectral range.

44. The optical filter device of claim 1, wherein the one of the first and second optical filters is tunable to so that none of the first reflective filter functions and second reflective filter functions overlap.

45. The optical filter device of claim 1, wherein the bandwidth of one of the first and second reflective filter functions are substantially the same.

46. The optical filter device of claim 1, wherein at least one of the first and second optical filters includes an optical waveguide comprising an optical cane element.

47. A tunable optical filter device comprising:

a first optical filter including a plurality of reflective elements, each of the reflective elements having a respective reflective filter function centered at respective reflection wavelengths for reflecting a respective first wavelength band of light, each of the first reflective filter functions being spaced and substantially non-overlapping; and a second optical filter, optically connected to the first optical filter to receive the first wavelength bands of light, including a plurality of transmissive elements, each of the transmissive elements having a respective transmissive filter function centered at respective transmissive for transmitting a respective second wavelength band of light, each of the transmissive filter functions being spaced and substantially non-overlapping;

one of the first and second optical filters being tunable to overlap at least one of the reflective filter functions and one of the transmissive filter functions.

48. The optical filter device of claim 47, wherein the reflective filter functions and the transmissive filter functions are spaced respectively to ensure only one reflective filter function and one transmissive filter function overlap when any complementary reflective filter function and transmissive filter function overlap.

49. The optical filter device of claim 47, wherein at least one of the first and second optical filters comprises an optical waveguide, wherein the reflective elements of the at least one of the respective first and second optical filters comprise respective gratings disposed in the core in a longitudinal direction.

50. The optical filter device of claim 47, wherein the first and second optical filters are simultaneously tuned to overlap each of the first reflection filter functions and each complimentary second reflection filter function to reflect sequentially a wavelength band of light over each respective spectral range.

51. A tunable optical filter device comprising:

a first optical filter including a plurality of transmissive elements, each of the transmissive elements having a respective transmissive filter function centered at respective transmissive wavelengths for transmitting a respective first wavelength band of light, each of the transmissive filter functions being spaced and substantially non-overlapping; and a second optical filter, optically connected to the first optical filter to receive the first wavelength bands of light, including a plurality of transmissive elements, each of the reflective elements having a respective reflective filter function centered at respective reflection wavelengths for reflecting a respective wavelength band of light, each of the reflective filter functions being spaced and substantially non-overlapping;

one of the first and second optical filters being tunable to overlap at least one of the transmissive filter functions and one of the reflective filter functions.

52. The optical filter device of claim 51, wherein the reflective filter functions and the transmissive filter functions are spaced respectively to ensure only one reflective filter function and one transmissive filter function overlap when any complementary reflective filter function and transmissive filter function overlap.

53. The optical filter device of claim 51, wherein at least one of the first and second optical filters comprises an optical waveguide, wherein the reflective elements of the at least one of the respective first and second optical filters comprise respective gratings disposed in the core in a longitudinal direction.

54. The optical filter device of claim 51, wherein the first and second optical filters are simultaneously tuned to overlap each of the first reflection filter functions and each complimentary second reflection filter function to reflect sequentially a wavelength band of light over each respective spectral range.

55. A tunable optical filter device comprising:

a first optical filter including a plurality of first reflective elements, each of the first reflective elements having a respective first reflective filter function centered at respective reflection wavelengths for reflecting a respective first wavelength band of light, each of the first reflective filter functions being spaced and substantially non-overlapping; and a second optical filter, optically connected to the first optical filter to receive the first wavelength bands of light, including a second reflective element, the second reflective element having a respective second reflective filter function centered at respective reflection wavelength for reflecting a respective second wavelength band of light;

one of the first and second optical filters being tunable to overlap only one of the first reflective filter functions and the second reflective filter function.

56. A tunable optical filter device comprising:

a first optical waveguide including a plurality of first gratings, each of the first gratings having a respective first reflective filter function centered at respective reflection wavelengths for reflecting a respective first wavelength band of light, each of the first reflective filter functions being spaced and substantially non-overlapping; and a second optical waveguide, optically connected to the first optical waveguide to receive the first wavelength bands of light, including a plurality of second gratings, each of the second gratings having a respective second reflective filter function centered at respective reflection wavelengths for reflecting a respective second wavelength band of light, each of the second reflective filter functions being spaced and substantially non-overlapping;

one of the first and second optical waveguides being tunable to overlap only one of the first reflective filter functions and one of the second reflective filter functions.

* * * * *